(12) United States Patent
Shen

(10) Patent No.: US 7,130,505 B2
(45) Date of Patent: Oct. 31, 2006

(54) OPTICAL PERFORMANCE MONITOR

(75) Inventor: Jinxi Shen, San Ramon, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/374,570

(22) Filed: Mar. 13, 2006

(65) Prior Publication Data

US 2006/0153498 A1    Jul. 13, 2006

Related U.S. Application Data

(63) Continuation-in-part of application No. 10/896,779, filed on Jul. 22, 2004, now Pat. No. 7,035,505.

(60) Provisional application No. 60/660,982, filed on Mar. 11, 2005, provisional application No. 60/489,545, filed on Jul. 23, 2003.

(51) Int. Cl.
G02B 6/28    (2006.01)
H04B 10/00    (2006.01)

(52) U.S. Cl. .......................................... 385/24; 398/135

(58) Field of Classification Search .................... 385/24
See application file for complete search history.

(56) References Cited

U.S. PATENT DOCUMENTS

| | | | |
|---|---|---|---|
| 5,233,405 A | 8/1993 | Wildnauer et al. | 356/333 |
| 5,414,540 A | 5/1995 | Patel et al. | 359/39 |
| 5,617,234 A | 4/1997 | Koga et al. | 359/131 |
| 6,075,647 A | 6/2000 | Braun et al. | 359/578 |
| 6,084,695 A | 7/2000 | Martin et al. | 359/131 |
| 6,363,089 B1 | 3/2002 | Fernald et al. | 372/20 |
| 6,377,730 B1 | 4/2002 | Bergmann et al. | 385/39 |
| 6,424,466 B1 | 7/2002 | Flanders | 359/578 |
| 6,542,659 B1 | 4/2003 | Flanders | 385/20 |
| 6,701,042 B1 * | 3/2004 | Kang et al. | 385/37 |
| 6,753,958 B1 | 6/2004 | Berolo | 356/328 |
| 6,868,200 B1 * | 3/2005 | Kimotsuki et al. | 385/24 |
| 6,915,030 B1 | 7/2005 | Svilans et al. | 385/14 |
| 6,941,079 B1 | 9/2005 | Barozzi et al. | 398/157 |
| 2002/0191887 A1 | 12/2002 | Bidnyk | 385/15 |
| 2004/0096151 A1* | 5/2004 | Svilans et al. | 385/27 |
| 2005/0031259 A1 | 2/2005 | Shen | 385/24 |

* cited by examiner

*Primary Examiner*—Sung Pak
*Assistant Examiner*—Tina M Wong
(74) *Attorney, Agent, or Firm*—Allen, Dyer, Doppelt, Milbrath & Gilchrist, P.A.

(57) ABSTRACT

An optical performance monitor for accurate monitoring of the OSNR of a WDM optical signal is provided wherein a demultiplexing arrayed waveguide grating (AWG) having a plurality of Vernier input ports is disposed between an optical switch and a photodiode array coupled to the output ports of the AWG. In operation, the optical switch sequentially provides the input optical signal into each of the Vernier ports, and signals detected by photodiodes are stored in a memory unit. The apparatus is capable of monitoring the OSNR of the WDM signal with a frequency step which is M times smaller than a frequency spacing between the AWG transmission bands, while enabling the OSNR monitoring in an enhanced dynamic range by providing accurate noise sampling.

20 Claims, 13 Drawing Sheets

OPTICAL PERFORMANCE MONITOR

CROSS-REFERENCE TO RELATED APPLICATIONS

The present invention claims priority from U.S. Provisional Patent Application No. 60/660,982 filed Mar. 11, 2005 entitled "Optical signal to noise ratio measurement . . ." and is a continuation in part of U.S. patent application Ser. No. 10/896,779 filed Jul. 22, 2004, now U.S. Pat. No. 7,035,505 entitled "Optical Performance Monitor", which claims priority from U.S. Patent Application No: 60/489,545 filed Jul. 23, 2003, which are incorporated herein by reference for all purposes.

TECHNICAL FIELD

The present invention relates to optical performance monitors for optical communications, and more particularly to a method and apparatus for accurate monitoring of the optical signal to noise ratio for a plurality of WDM channels propagated via an optical medium.

BACKGROUND OF THE INVENTION

Optical communication systems employing wavelength division multiplexed (WDM) technology achieve large transmission capacity by spacing optical channels as closely as possible, typically less than a nanometer (nm) apart. As the channel spacing decreases, monitoring spectral characteristics of the channels becomes more critical in verifying system functionality, identifying performance drift, and isolating system faults. For example, such monitoring is critical in detecting wavelength drift, which can readily cause signals from one optical channel to cross into another. Also, real-time feedback to network elements is critical to ensure stable operation of optical amplifiers commonly employed in the network.

Optical instruments for measuring optical power as a function of wavelength, called optical spectrum analyzers (OSAs), are known in the art. Most conventional OSAs use a wavelength tunable optical filter, such as a Fabry-Perot interferometer or diffraction grating, to resolve the individual spectral components. In the latter case, light is reflected off the diffraction grating at an angle proportional to the wavelength. The spectrum of the light is then analyzed on the basis of the angle at which the light is diffracted using a detector array. Alternatively, the diffracted light is moved over a slit and then detected using a small detector.

Traditional optical spectrum analyzers (OSAs) are manufactured as laboratory devices which operate under laboratorial environmental conditions. A sophisticated wavelength and optical power calibration from time to time is required to ensure the wavelength and power accuracy of the device. Furthermore, they are generally bulky as well as costly.

Optical communication systems require industrial grade optical performance monitors (OPM), which function similarly to the traditional OSA, but are however subject to stringent industrial requirements. They must be relatively inexpensive, compact in size, with the reporting power and wavelength accuracy nearly the same as laboratorial grade OSAs, however without requiring extra calibration during the lifetime of the device, and be capable of monitoring light at densely spaced frequency points with high wavelength resolution and high dynamic range.

It is advantageous to have an OPM capable of monitoring all channels in one optical band of an optical communication link. It is also advantageous to have an additional functionality of monitoring an optical to signal noise ratio (OSNR) for each channel, which requires monitoring not only individual channels, but also light between channels to estimate an optical noise level, thereby further increasing spectral resolution requirements for an OPM. Today's WDM networks may employ as many as 200 channels with 25 GHz spacing between the channels in one optical communication band of approximately 5000 GHz; these networks would benefit from an OPM capable of monitoring at lest 200 frequency channels with 25 GHz spacing. Such an OPM could also be advantageously used in communication systems having 200 GHz, 100 GHz, and 50 GHz spaced channels by providing an OSNR monitoring capability.

One type of industrial-grade OPMs acquires all monitored spectral points of an optical spectrum of an input signal in parallel by dispersing the input light in space and using a plurality of photodetectors, e.g. a photodiode array (PDA), to simultaneously acquire spectral information at a plurality of monitored frequencies; a bulk grating, a blazed fiber Bragg grating, a waveguide echelle grating or an array waveguide grating (AWG) can be used as such a dispersive element.

Disadvantageously, both the size of the dispersive element and the number of photodiodes in the PDA scale proportionally to the wavelength resolution, thereby increasing the size and cost of the device and reducing it reliability. If the OSNR of each channel is to be measured, several photodetectors have to be provided within the dispersed light of a single channel. Thus, a four channel optical monitor typically requires at least 12 photodiodes. Since current photodiode arrays are typically supplied in strips of up to 128 photodiodes, this allows monitoring of just over 30 channels.

For example, U.S. Pat. No. 5,617,234 issued Apr. 1, 1997 in the name of Koga et al. discloses a multi-wavelength simultaneous monitoring circuit capable of precise discrimination of wavelengths of a WDM signal, and suitable for optical integrated circuits. The device proposed by Koga is an AWG that has a single input port and multiple output ports and has photodetectors coupled to the output ports of the AWG. An AWG has a functionality of splitting an input signal into several output frequency bands, each having a bandwidth b, centered at a set of frequencies $f_n$ spaced by an output frequency spacing $\Delta f \geq b$, and dispersing them in space to different locations where they are picked up by output waveguide to be output through their respective output ports. Koga's device requires an AWG having a number of output ports equal to a number of monitoring channels with frequency resolution better than spacing between the channels, and a number of costly photodetectors equal to the number of channels to be monitored, without providing an OSNR measurement capability.

AWGs offer several advantages when used as the dispersive elements, such as relative compactness, option of on-chip integration with other optical components of an optical circuit thereby drastically lessening optical losses and reducing cost and complexity of the optical circuit, and manufacturing technology amenable to mass-production. However, they typically offer only limited frequency resolution with a limited number of output channels, typically between 8 and 40, with a frequency spacing between output channels ranging from 400 to 50 GHz. Decreasing the frequency spacing further below 25 GHz as may be necessary for accurate OSNR monitoring requires progressively larger and more expensive devices, with increasing cost per monitored channel.

Another known type of OPMs involves sequential acquisition of spectral data points, and is based on tunable filters with output coupled to a typically single photodetector, wherein the spectrum is measured by scanning the filter passband over a frequency range of interest, and adjacent spectral points are accessed sequentially in time. The tunable filter employed in this approach can be based on a bulk—surface or volume—grating, a fiber Bragg grating, a tunable linear or ring resonator. However, using tunable filters may require complex dynamic control loops and real-time monitoring of the tuning to ensure reproducibility. Higher wavelength resolution requires larger tunable filters and progressively more strict requirements on tuning filters wherein progressively finer tuning is required, complicating the control loops and affecting reproducibility issues.

Recently, attempts have been made to provide a solution to this problem of scaling by combining the aforedescribed sequential and parallel acquisition approaches in a way wherein the size, the design complexity, e.g. the number of photosensitive elements, and the control complexity of the monitor scales sub-linearly with a number of monitored wavelengths within a monitored range of wavelengths.

A U.S. Pat. No. 6,915,030 to Svilans et al. assigned to JDS Uniphase, the assignee of this application, discloses an AWG-based OPM that combines a single-input port AWG with a tunable filter having a bandwidth and an FSR to obviate the aforementioned problems, by monitoring a larger number of channels, greater than a number of AWG output ports and associated photodiodes. The tunable filter pre-selects periodic subsets of channels to be input through the single input port of the AWG, and different subsets of channels are sent sequentially to the input port of the AWG thereby time-sharing the AWG and associated photodiodes coupled to the output ports thereof to acquire information about a number of spectrally-resolved channels larger than the number of AWG output ports and coupled to them photodiodes. Although the devices described by Svilans et al. offer considerable advantages by reducing the number of photodiodes per WDM channel, it employs a tunable filter that may require real-time monitoring and relatively complex control circuitry to ensure wavelength tuning reproducibility.

U.S. Pat. No. 6,753,958 in the names of Berolo et al discloses an alternative approach to monitoring of a large number of wavelength with a relatively small number of photodiodes without dynamically tuning frequency-selective elements that may require complex real-time monitoring and control. Berolo et al teach an OPM that has an optical input port coupled through a switch to a plurality of input waveguides, which are sequentially switched to provide light received from the input port via one of the input waveguides to a waveguide echelle grating, which disperses the light toward a plurality of photodetector. The echelle grating disperses light received from an input waveguide in dependence upon the input waveguide position, so that light picked up by the photodetectors has different centre wavelengths depending on via which of the input waveguides the light entered the grating. By arranging the input waveguides so that the centre wavelengths sampled by photodiodes shift by a fraction of the channel spacing of the WDM signal when the light is switched between adjacent input waveguides, the WDM signal carried by the light can be sampled with a frequency period equal to the fraction of the channel spacing.

The method of Berolo et al may enable monitoring a WDM signal at a number of wavelength equal to the number of photodiodes times the number of input ports in a compact relatively inexpensive device. However, the particular approach of Berolo et al wherein spectrally adjacent central wavelengths shifted by a small fraction of the channel spacing equal to the OPM resolution are sampled by coupling the light into adjacent input waveguides may be severely limiting at least in some applications, since it may require the input waveguides to be positioned close to each other when the required spectral resolution is small, as for the OSNR measurements, which may lead to an undesirable optical coupling between adjacent input waveguides.

An object of this invention is to provide an optical performance monitor having a dispersive element with multiple output ports and switchable multiple input ports configured for accurately measuring the OSNR of individual WDM channels of a multi-channel optical signal without unwanted optical coupling between the input ports.

It is another object of this invention to provide a method of accurate OSNR measurements for multiple optical channels of a WDM optical signal in an optical performance monitor, wherein the optical spectrum of the WDM signal is sampled at a plurality of sampling frequencies by switching between input ports of a multi-input multi-output AWG.

Another object of this invention is to provide an optical performance monitor and a method of using thereof for accurate simultaneous OSNR measurements for multiple optical channels of a WDM optical signal, wherein an optical spectrum of the WDM signal is sampled at a plurality of sampling frequencies by switching between input ports of a multi-input multi-output AWG, and wherein spectral samples at adjacent sampling frequencies are acquired by switching between non-adjacent input ports.

SUMMARY OF THE INVENTION

In accordance with the invention, an optical performance monitor is provided for monitoring an OSNR of an input optical signal comprising a plurality of WDM channels having evenly spaced channel center frequencies with a channel frequency spacing $\Delta_{ch}$. The optical performance monitor comprises: a dispersive element comprising M input ports and J output ports, wherein M>2 and J>2, a control means disposed to receive the input optical signal for optically coupling said input signal sequentially into each of the M input ports; a photodetector means optically coupled to the J output ports for providing electrical signals related to an optical power in each of the J output ports when the input signal is coupled into any of the M input ports; and, a processing means for determining the OSNR of the input optical signal from the electrical signals provided by the photodetector means.

The dispersive element is for optically coupling each of the input ports with each of the output ports at a different center frequency in dependence on positions of respective input and output ports, for sampling an optical spectrum of the input optical signal at a plurality of the central frequencies when the input light is sequentially coupled into the M input ports.

The J output ports of the dispersive element are configured for optical coupling to one of the M input ports at a first set of J of the central frequencies, which are evenly spaced by the frequency spacing $\Delta_{ch}$, and shifted from the channel frequencies by a pre-determined fraction of the channel spacing $\Delta_{ch}$ for sensing optical noise level between the WDM channels, while the M input ports are configured for optical coupling to a selected one of the J output ports at a second set of M of the central frequencies wherein adjacent central frequencies are spaced by at least $2 \cdot \Delta_{ch}/M$.

The dispersive element is characterized by a spatial dispersion characteristic that varies in dependence on the input port, and wherein the plurality of central frequencies includes a sequence of at least M consecutive central frequencies wherein frequency spacing between adjacent central frequencies varies by more than a pre-determined amount due to the input port dependence of the spatial dispersion characteristic of the dispersive element.

In accordance with one aspect of the invention, the M input ports are configured so that the second set of M of the central frequencies can be mapped onto a periodic sequence of M sampling frequencies spaced by $\Delta_{ch}/M$ by shifting one or more of the second set of M of the central frequencies by a channel frequency spacing $\Delta_{ch}$ or a harmonic thereof, wherein the second set of M sampling frequencies spans a frequency range that is less than two channel frequency spacings $\Delta_{ch}$.

Another aspect of the invention provides a method for monitoring an OSNR of the input optical signal comprising the steps of:

a) providing a dispersive element comprising M input ports and J output ports, wherein M>2 and J>2;
b) configuring the J output ports for optical coupling to a selected one of the M input ports at a first set of J central frequencies which are evenly spaced by the frequency spacing $\Delta_{ch}$, and shifted from the channel frequencies by a frequency shift substantially equal to $\Delta_{ch}/2$;
c) configuring the rest of the M input ports for coupling to the J output ports at J×(M−1) different central frequencies, so that in operation one of the J output ports is optically coupled to each of the M input ports at a second set of central frequencies that are spaced by at least $2\Delta_{ch}/M$;
d) coupling the input optical signal into the selected one of the M input ports of the dispersive element;
e) detecting optical power in each of the J output ports with a photodetector to obtain J power readings, and storing them in a memory unit;
f) sequentially coupling the input optical signal into each of the other M input ports of the dispersive element, each time repeating step (e);
g) processing the power readings obtained with the input optical signal coupled into the selected one of the M input ports to determine an optical noise value for at least one of the WDM channels;
h) processing the stored power readings obtained with the input optical signal coupled into the rest of the M input ports to determine an optical signal value for the at least one of the WDM channels; and,
i) computing an OSNR value for the at least one of the WDM channels using the respective optical signal and noise values obtained in steps (g) and (h).

BRIEF DESCRIPTION OF THE DRAWINGS

The invention will be described in greater detail with reference to the accompanying drawings which represent preferred embodiments thereof, wherein.

DETAILED DESCRIPTION

US Patent application 2005/0031259 in the names of Shen et al, which is incorporated herein by reference and is assigned to JDSU, the assignee of the current invention, and of which the first inventor is the inventor of the current application, discloses an OPM that in its preferred embodiment employs a multi-input multi-output AWG, and functions somewhat similarly to the Berolo's device, but with a different input-output port configuration. Namely, the multi-input multi-output AWG disclosed in '259 employs Vernier input ports configured so that when the input signal is switched from one input port to a next one, the sampling frequencies shift by a comparatively large frequency shift, for example equal to the WDM channel spacing, plus/minus a relatively small fraction thereof that defines the overall spectral resolution of the OPM. Accordingly, input waveguides that compose the M Vernier input ports of the OPM disclosed in 2005/0031259 are positioned sufficiently far from each other so not to cause the undesirable waveguide coupling that detrimentally affects the Berolo OPM.

The current invention further improves on the OPM disclosed in the US Patent application 2005/0031259, and provides an improved OPM with multiple switchable input ports configured for monitoring the OSNR of individual channels of a multi-channel WDM signal with enhanced measurement accuracy.

Figure 1:
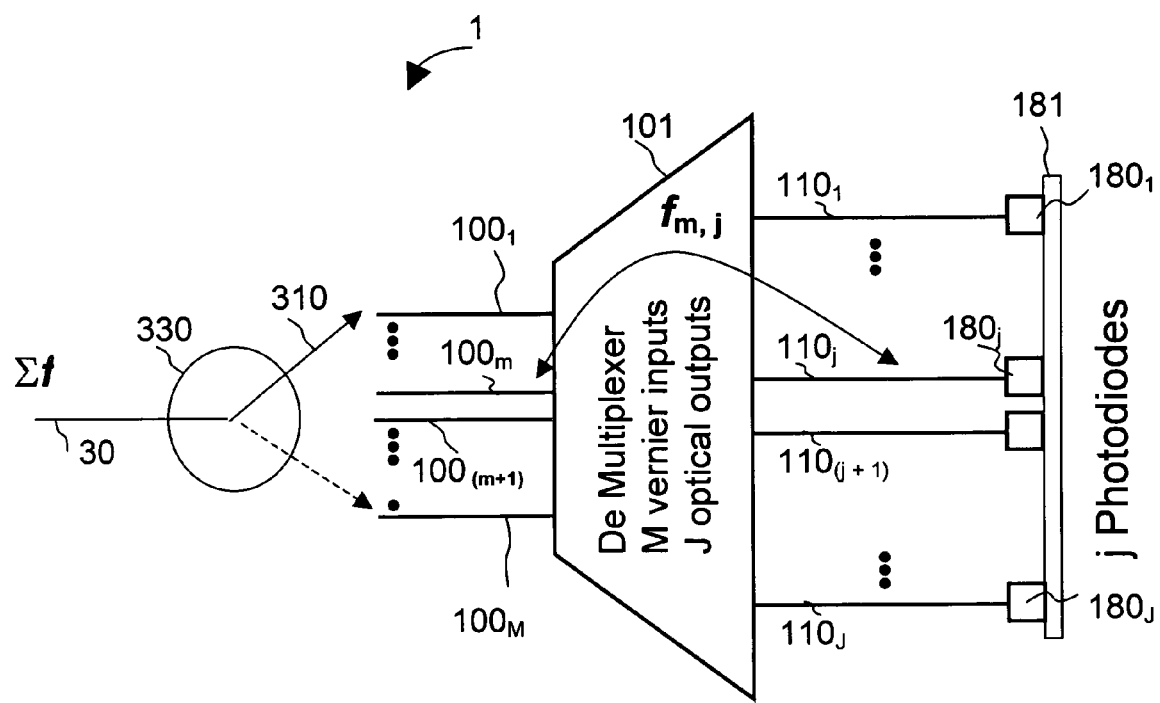
FIG. 1 is a general diagram of the optical performance monitor for monitoring an input optical signal according to the invention.

FIG. 1 shows an embodiment of the optical apparatus for monitoring an optical signal using a multi-input multi-output dispersive element.

The apparatus 1 for monitoring an input optical signal at a plurality of K distinct optical frequencies, K>1, has a dispersive element 101 disposed between a 1×M switching means 330 and a photodetector means 181; the apparatus 1 will also be referred to hereinafter as the OPM 1. The 1×M optical switching means 330 hereinafter is also referred to simply as the switch 330. In other embodiments, an N×M switch can be used in place of the 1×M switch 330 so to enable sharing the OPM 1 between up to N input optical signals, each propagating in their own optical waveguides, e.g. optical fibers, to sequentially monitor the respective optical spectra and the OSNR, as is described hereafter in this specification for a single WDM signal. The dispersive element 101 in the form of an AWG has M input ports $100_1$ to $100_M$ and J output ports $110_1$ to $110_J$, which are generally referred to hereinafter as the input ports 100 and the output ports 110 respectively. The switch 330 has a functionality of controllably providing optical coupling between an input port 30 of the OPM 1 and any one of the input ports 100 of the AWG 101, as schematically shown by an arrow 310. The output ports 110 of the AWG 101 are optically coupled to the photodetector means 181 in the form of a photodiode array (PDA) assembly having J photodiodes $180_1$ to $180_J$, each optically coupled to a different one of the output ports 110 of the AWG 101 for detecting light output therefrom and for providing electrical signals related to an optical power in each of the J output ports when the input signal is coupled into each of the M input ports, said electrical signals also referred to hereinafter as power readings.

In other embodiments, the AWG 101 can be substituted by other dispersive elements, e.g. a waveguide echelle grating, a bulk grating, a blazed grating, a volume Bragg grating and a holographic grating g, as will be understood by those skilled in the art. Embodiments wherein the dispersive element 101 and the switch 330 are implemented in a PLC chip may be advantageous for some applications. The photodetector means 181 can have alternative embodiments, e.g. in the form of a charge coupled array device.

The apparatus 1 also has electronic control and processing means, which are not shown in FIG. 1, including at least a controller for controlling the switch 330, a memory for collecting and storing information detected by the photodetector means 181, and a processor for processing the collected information, e.g. for determining the OSNR of the input optical signal from the electrical signals provided by the photodetector means 181, and for outputting processed information. The switch 330 and its corresponding controller comprise a control means for optically coupling the input optical signal sequentially into each of the M input ports $100_1$ through $100_M$ of the AWG 101.

In the AWG 101, each of the input ports 100 is optically coupled with any one of the output ports 110 in a narrow frequency band of width b centered at a different central frequency in dependence on positions of respective input and output ports, so that for example an $m^{th}$ input port $100_m$ is optically coupled to a $j^{th}$ output port $110_j$ only within a narrow frequency band defined by a transmission function $T_{m,j}(f-f_{m,j})$ of the width b centered at a central frequency $f_{m,j}$, which is hereafter also referred to as a sampling frequency; the $m^{th}$ input port $100_m$ is coupled also to a neighboring $(j+1)^{th}$ output port at another central frequency $f_{m,j+1}=f_{m,j}+\Delta f_1$, where a first frequency spacing $\Delta f_1$ is substantially greater than b, e.g. by a factor on the order of M.

Functionally, the dispersive element 101 disperses the input signal coupled into any of the input ports 100 in space according to its optical spectrum toward the output ports 110, and couples J spectral portions of the input signal within each of the respective frequency bands into a different one of the J output ports $110_1$ to $110_J$, each of the J spectral portions thereby associated with an $m^{th}$ input port is centered at a different one of J central frequencies $f_{m,j}, j=1, \ldots, J$, in dependence on positions of respective input and output ports. Said J central frequencies together form an $m^{th}$ set $\{f\}_m = \{f_{m,j=1}, f_{m,j=2}, \ldots, f_{m,j=J}\}$ of central frequencies spaced by $\Delta f_1$ and spanning a frequency range $F_J=(J-1)\cdot\Delta f_1$, which will be referred to hereinafter as the operating frequency range of the AWG 101. Note that the first frequency spacing $\Delta f_1$ is preferably the same for any one of the input ports 100, i.e. any value of m between 1 and M, but can vary in dependence on the input port m if the input ports 100 are disposed relatively far apart, as will be explained hereinafter. In the following we will first describe a scenario when $\Delta f_1$ can be considered to be input port independent, i.e. when the number of input ports is small enough and they are positioned suitably close to each other so that the variations in $\Delta f_1$ between input ports 100 do not accumulate over the frequency range $F_J$ beyond a pre-defined sampling frequency tolerance, which may depend on a particular application.

The dispersive element 101 with the output ports 110 and the PDA 181 cooperate for sampling the optical spectrum of the input optical signal at a plurality of the central frequencies when the input light is sequentially coupled into the M input ports. This plurality of central frequencies $f_{m,j}$, wherein the input and output port integer counters m and j span all values in the ranges $1 \leq m \leq M$ and $1 \leq j \leq J$, is composed of the M interleaved sets of the J central frequencies $\{f\}_m$, $m=1, \ldots, M$, and will be hereafter referred to also as the plurality of all central frequencies $\{f_{m,j}\}$. The plurality of central frequencies $\{f_{m,j}\}$ includes the first plurality of K distinct optical frequencies, and preferably coincides with it.

Note that the AWG 101 differs from conventional de-multiplexing AWGs with multiple input ports and multiple output ports, as for example the AWG described in U.S. Pat. No. 5,617,234 to Koga et al. teaching a multi-wavelength simultaneous monitoring circuit. Indeed, a de-multiplexing AWG having multiple input ports has the functionality of splitting an optical signal coupled into one of it input ports into approximately periodically-spaced frequency bands, and dispersing them to different locations where they are picked up by output waveguides to be output through their respective output ports. In a configuration described by Koga, assuming the aforedescribed notations for input ports and output ports, the correspondence between the center transmission frequencies $f_{m,j}$ and the output ports periodically shifts by one channel when the input waveguide is shifted by one position, meaning that $f_{m,j}=f_{m+1,j+1}$. That is, if the AWG 101 would be as described by Koga, if an input optical signal carries a channel centered at frequency $f_{m,j}$, this channel will be output from the $j^{th}$ port $110_j$ if the input optical signal is coupled into the $m^{th}$ input port $100_m$, and will be output from the $(j+1)$th output port $110_{(j+1)}$ when the input optical signal is coupled into the $(m+1)$th input port $100_{(m+1)}$. This functionality of the conventional AWG allows any input port to be used for frequency de-multiplexing a signal having optical channels spaced periodically in frequency.

Contrary to the aforedescribed functionality of the prior-art de-multiplexing AWG with multiple input ports, the input ports $100_1$ to $100_M$ of the AWG used as the dispersive element 101 of the present invention are disposed so that $$f_{m,j} \neq f_{m+1,j+1}, \qquad (1)$$

for at least some of the respective port pairs, i.e. for at least some of, and preferably all of the port 100, 110 indices $j=1, \ldots, J-1, m=1, \ldots, M-1$. More particularly, the M input ports 100 are configured so that they are optically coupled to one of the J output ports 110, e.g. to the $j^{th}$ port $110_j$, at a set of M of the central frequencies $\{f\}_j = \{f_{m=1,j}, f_{m=2,j}, \ldots, f_{m=M,j}\}$, which for a particular j will be referred to hereinafter as the second set of M of the central frequencies. In this set, each adjacent two of the central frequencies $f_{m,j}$, e.g. $f_{m',j}$, and $f_{m'+1,j}$, are spaced by a second frequency spacing $\Delta f_2(m)$ which differs from the first frequency spacing $\Delta f_1$ or any harmonic thereof, i.e.

$$(f_{m,j}-f_{m+1,j})=\Delta f_2(m) \neq \Delta f_1. \qquad (2)$$

The second frequency spacing $\Delta f_2$, which is a frequency shift between sampling frequencies $f_{m,j}$ and $f_{m+1,j}$ associated with adjacent two of the M input ports 100 and a same one of the J output ports 110 as defined by equation (2), can depend on the input port, as indicated by the index port number m in the RHS of equation (2), i.e. can differ for different pairs of adjacent input ports 100; it also represents a relative shift between two of the sets $\{f\}_m = \{f_{m,j=1\ldots J}\}$ of J sampling frequencies associated with adjacent two of the M input ports 100, e.g. ports 100$_m$ and 100$_{m+1}$. Note that the second frequency spacing $\Delta f_2(m)$ is also a frequency spacing between central frequencies of spectral portions of the input optical signal received in the ports 100$_1$ to 100$_M$ when an input optical signal is coupled into one of the ports 110$_1$ to 100$_J$. The relationship (2) means therefore that the AWG 101 is asymmetrical with respect to the frequency spacing between the central transmission frequencies, with said spacing depending on which set of ports 100$_{1\ldots M}$ or 110$_{1\ldots J}$ is used as a set of input ports.

The input ports 100 are preferably configured so that the second frequency spacing $\Delta f_2(m)$ is equal to an integer number of frequency fractions $\delta f = \Delta f_1 / M$, i.e.

$$\Delta f_2(m) = k_m \cdot \Delta f_1 / M, \quad (3)$$

where integers $k_m$ preferably satisfy $$k_m \geq 2, \quad (3a)$$

and are such that the M frequency sets $\{f\}_m$ are interleaved and together form a periodic grid of the sampling frequencies $f_{m,j}$ with a period generally equal to $\delta f = \Delta f_1 / M$. The second frequency set $\{f\}_j$ spans a frequency range $$F_M = \frac{\Delta f_1}{M} \sum_{m=1}^{M-1} k_m, \quad (4)$$

which is referred to hereinafter as the Vernier range of the AWG 101. The frequency fraction $\delta f$ determines a frequency resolution of the apparatus 1 of the present invention.

In one embodiment of the OPM 1, the AWG 101 has at least four input ports 100, i.e. M>3, which are configured so that the set of the M central frequencies $\{f\}_j$ is evenly spaced, $n_m = n = M \pm 1$, and $$\Delta f_2 = \Delta f_1 \cdot (1 \pm 1/M), \quad (5)$$

Note that the condition (3a) distinguish the OPM 1 from the optical spectrometer of Berolo et al, in which, using the notation defined herein, $\Delta f_2 = \Delta f_1 / M$, corresponding to a wider spacing between the ports 100 and, advantageously, smaller unwanted optical coupling therebetween in embodiments wherein the ports 100 include optical waveguides.

In operation, the input optical signal is coupled into the input port 30 of the 1×M switch 330 for monitoring said signal. A main function of the 1×M switch 330 is to establish an optical path from the input port 30 to sequentially each of the input optical ports 100 of the dispersive element 101, from the port 110$_1$ to the port 110$_M$, as shown by the arrow 310 that represents the optical path for the input signal which is sequentially in time established by the switch 330 to each input port of the dispersive element 101.

For example, the input optical signal including all frequencies from the plurality $\{f_{m,j}\}$ is first coupled into the input port 100$_1$, and information about the input signal, such as e.g. optical power within a corresponding set of the dispersive element transmission bands centered at a set $\{f\}_{m=1}$ of J sampling frequencies $$f_{1,j} = f_{1,1} + (j-1) \cdot \Delta f_1, j=1,\ldots,J \quad (6)$$

is collected by the J photodetectors 180$_1$ to 180$_J$.

Next, the input signal is coupled into the second input port 100$_2$, not shown in the FIG. 1, of the dispersive element 101, and information about the input signal is collected by the J photodetectors 180$_1$ to 180$_J$ at a set $\{f\}_{m=2}$ of J sampling frequencies $f_{2,j}, j=1,\ldots,J$, associated with the second input port 100$_2$.

Considering here an embodiment wherein the M input ports 100 are configured so that equation (5) is satisfied, $\Delta f_2 = \Delta f_1 \cdot (1+1/M)$, and that the first frequency spacing $\Delta f_1$ varies little for the input ports 100, the sampling frequencies $f_{2,j}$ satisfy the equation $$f_{2,j} = f_{1,1} + (j-2) \cdot \Delta f_1 - \delta f \quad (7)$$

Switching the input signal consecutively in M steps through all M input ports of the dispersive element 101, and at each step collecting and storing the information collected by the J photodetectors about the signal at a respective set of J frequencies, information is obtained about the signal at M sets $\{f\}_m$, m=1, ..., M, of J sampling frequencies $$f_{m,j} = f_{1,1} + (j-m) \cdot \Delta f_1 - (m-1) \cdot \delta f, j=1,\ldots,J, \quad (8)$$

The use of two dissimilar periods $\Delta f_1$ and $\Delta f_2$ differing by a fraction of the period $\Delta f_1$ producing a scale with a fractional period $\Delta f_1 / M$ is analogues to a well-known Vernier scale in e.g. Vernier calipers; the M input ports of the dispersive element 101 are therefore referred to in the specification as the Vernier ports. This scale is illustrated in FIG. 2a for an exemplary embodiment of J=8, M=3, and $\delta f = \Delta f_2 - \Delta f_1 = \Delta f_1 / M = \Delta f_1 / 3$. Each of the vertical bars in this figure symbolically represent one of the sampling frequencies $f_{m,j}$ satisfying equation (8). The top row 311 represents the set of sampling frequencies $\{f\}_{m=1}$ associated with the first input port 100$_1$, including sampling frequencies $f_{1,1}$ 11, $f_{1,2}$ 12, ... $f_{1,8}$ 18; the second row 312 represents the set of sampling frequencies $\{f\}_{m=2}$ associated with the second input port 100$_2$ not shown in FIG. 1, including sampling frequencies $f_{2,1}$ 21, $f_{2,2}$ 22, ..., $f_{2,8}$ 28; and the third, lowest row 313 represents the set of sampling frequencies $\{f\}_{m=3}$ associated with the third and last input port 100$_{M=3}$, including sampling frequencies $f_{3,1}$ 31, $f_{3,2}$ 32, $f_{3,3}$ 33, ..., $f_{3,8}$ 38.

Note that each two of the sampling frequency sets $\{f\}_m$ associated with adjacent input ports 100, e.g. the sets 311 and 312, and 312 and 313, are shifted relative to each other by the second frequency spacing $\Delta f_2$, which in this case exceeds the first frequency spacing $\Delta f_1$.

Figure 2B:
FIG. 2b is a map of sampling frequencies for the OPM of the current invention in one embodiment thereof.
Figure 2A:
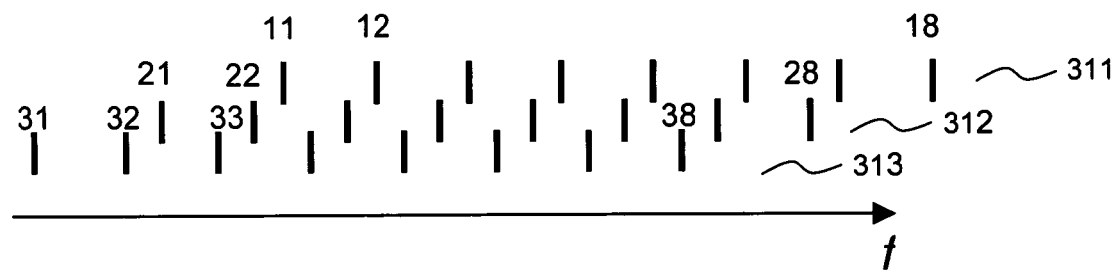
FIG. 2a is a map of sampling frequencies for a prior art OPM with multiple input ports.

FIG. 2b shows for comparison the sampling frequencies arrangement of the prior art optical spectrometer disclosed by Berolo et al in the U.S. Pat. No. 6,753,958, also having multiple switchable optical ports coupled to a dispersive element in the form of an echelle grating. Note that in the device of Berolo, the sampling frequency sequences 301, 302, and 302, 303 corresponding to adjacent input ports are shifted by the fraction $\delta f = \Delta f_1 / 3$ of the first period $\Delta f_1$, so that adjacent sampling frequencies in the resulting sampling grid $\{f_{m,j}\}$, m=1,2,3, j=1, ... 8, are associated with adjacent input ports. Disadvantageously, such an arrangement was found to lead to an undesirable optical coupling between adjacent input ports 100 at least when the dispersive element 101 is an AWG and the ports 100 are waveguide ports. This undesirable optical coupling can substantially decrease frequency resolution of the spectral measurements, and may render the input port arrangement of the Berolo device unusable for some applications.

Turning back to FIG. 2a, this embodiment of the shown invention wherein the input ports 100$_1$ to 100$_M$ of the dispersive element 101 are disposed so that $\Delta f_2 - \Delta f_1 = \Delta f_1 / M$ for all input ports 100, and the number of output ports 110

J exceeds the number of input ports 100 M, the plurality of all sampling frequencies $\{f_{m,j}\}$ includes evenly spaced sampling frequencies $f_{m,j}$ positioned in frequency space between frequencies $f_{1,1}$ and $f_{1,J'}$, where J'=(J−M+1), which form a periodic set of sampling frequencies spaced by δf, consisting of at least K=(J−M)·M frequencies, which is referred to hereinabove as the first plurality of K distinct optical frequencies. Using this embodiment of the OPM 1, by measuring optical powers in the output ports 110 when the input optical signal is sequentially switched between the M Vernier ports 100, the optical spectrum of the input signal can be evenly sampled in a frequency range ~(F_J−F_M), i.e. between frequencies $f_{1,1}$ and $f_{1,J'}$, and the optical spectrum thereof acquired with spectral resolution of δf=Δf_1/M that is M times smaller than would be provided by a conventional single-input AWG of otherwise similar design.

Figure 3:
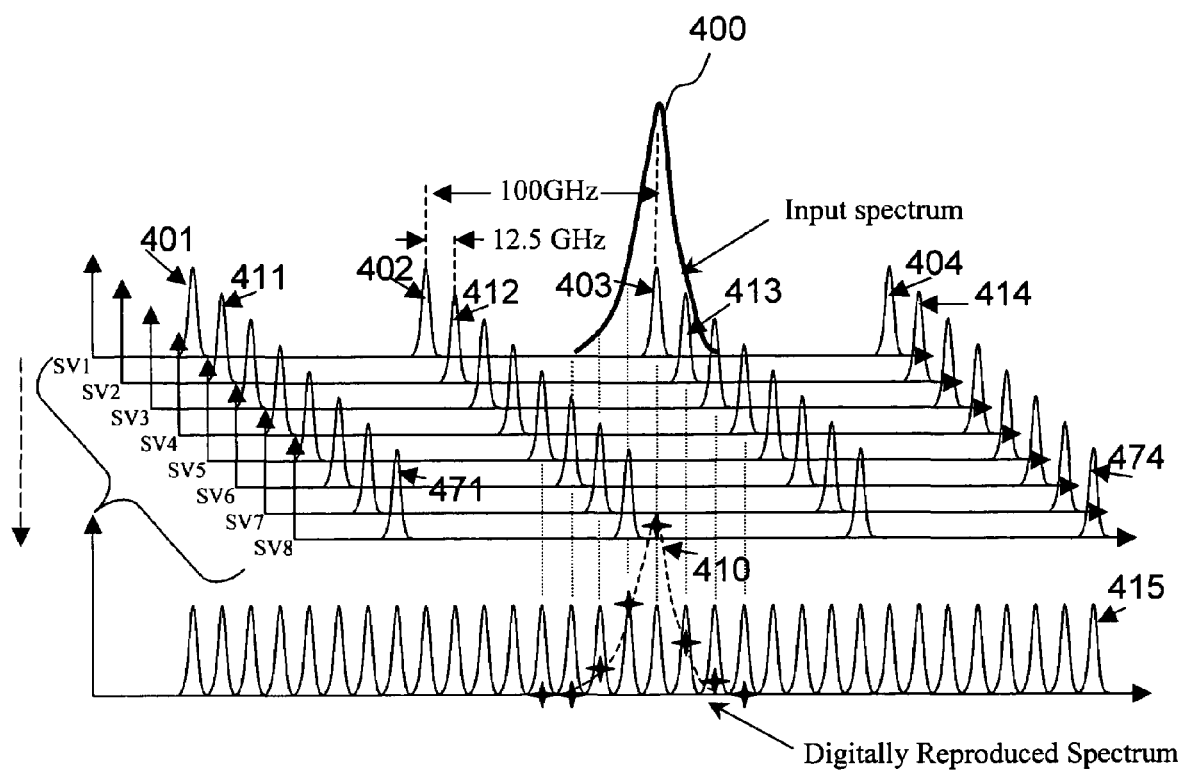
FIG. 3 is a diagram of spectral bands monitored by the apparatus of the present invention.

By way of example, FIG. 3 illustrates acquiring a spectrum of an input optical signal having a single spectral line 400 using the apparatus of the present invention. In this example, the dispersive element is an AWG having parameters M=8, Δf_1=100 GHz, Δf_2=87.5 GHz, δf=12.5 GHz, J=40; such AWG can be manufactured using currently available fabrication technologies. A set of 8 plots labeled SV1 to SV8 shows transmission bands 401–404, 411–414, . . . 471–474, each corresponding to a set of 4 adjacent output ports of the 40 output ports 110 of the dispersive element 101 when the input optical signal is consecutively coupled into each of the 8 input ports $100_1$ to $100_{M=8}$ of the dispersive element 101. The transmission bands 401, 402 etc are shown in FIG. 3 by bell-shaped curves representing their respective spectral transmission functions $T_{m,j}(f-f_{m,j})$, each centered at a different one of the sampling frequencies $f_{m,j}$. The transmission function $T_{m,j}(f-f_{m,j})$ can be also referred to as the sampling function that is associated with the $m^{th}$ input port and the $j^{th}$ output port, and can be measured e.g. by coupling light from a wavelength—tunable monochromatic source, e.g. a tunable laser, into the $m^{th}$ input port of the AWG 101, and measuring an optical power in the $j^{th}$ output port in dependence on the laser optical frequency f. Note that the transmission bands 401 and 411 correspond to different output ports 110, while the bands 411 and 402 correspond to a same one of the output ports 110 and adjacent two of the input ports 100.

The AWG 101 in some embodiments thereof is configured so that there is a moderate overlap between the transmission bands, e.g. 401 and 411, that are adjacent in the frequency space, i.e. have central frequencies shifted by δf=12.5 GHz as shown in FIG. 2, but there is only a very small amount of overlap with a next adjacent transmission band, e.g. spaced in a summary transmission spectrum 415 of the AWG by 25 GHz. The overlap information is preferably stored in the electronic memory (not shown) of the apparatus 1 for calibration purposes. In some embodiments, it may be preferred that the adjacent in spectrum transmission bands are overlapped even stronger that shown in FIG. 3, e.g. the 3 dB width b of the transmission functions $T_{m,j}(f-f_{m,j})$ is close to the frequency sampling step δf, b~δf, so that the spectrum is acquired without substantial gaps. Advantageously, the Vernier input port arrangement of the present invention, wherein spectral samples at adjacent central frequencies, e.g. samples 411 and 402, are acquired by switching between non-adjacent input ports, enables to avoid the unwanted optical coupling between input waveguide ports associated with overlapping transmission bands.

In each consecutive step, a portion of the spectral line 400 within each transmission band $T(f-f_{m,j})$ is detected by a photodetector 180 from the photodetector array assembly 181 that is coupled to a corresponding output port of the dispersive element 101, and 40 power reading values provided by the photodetectors are stored in the memory. After stepping the input signal through all of the 8 input ports, the totality of all stored values can be used to produce a digitized line 410 reproducing the input spectral line 400 on a digitized frequency scale with a frequency step δf=12.5 GHz, as illustrated by a summary transmission spectrum 415 of the dispersive element 101, the spectrum 415 obtained by superimposing the AWG transmission spectra SV1 to SV8 corresponding to sequential coupling of the input signal into each of the 8 input ports $100_1$ . . . $100_{M=8}$. Alternatively, if the line 400 represents one optical channel of a WDM signal, only the power readings corresponding to central, or sampling, frequencies $f_{m,j}$ within one channel grid period about said optical channel can be used to make a determination about the channel 400.

Monitoring WDM Signal

Embodiments of the OPM 1 of the present invention configured for monitoring a multi-channel optical WDM signal S comprising a plurality of WDM channels, including simultaneous monitoring of the OSNR of each of the WDM channels, and a method of such monitoring according to the present invention are described hereinbelow.

The multi-channel optical signal S has WDM channels that are positioned equidistantly in frequency, i.e. have central channel frequencies $\nu_n$ which are evenly spaced with a channel frequency spacing $\Delta_{ch}$, i.e. $(\nu_{n+1}-\nu_n)=\Delta_{ch}$ for any integer channel index n. By way of example, the channel frequencies $\nu_n$ are positioned on the ITU grid, and are multiples of 100 GHz, with $\Delta_{ch}$=100 GHz. In another example, they can be multiples of 50 GHz, with $\Delta_{ch}$=50 GHz. A frequency scale defined by equation (9) will be referred to hereinafter as the channel frequency grid $\{\nu_n\}$, $$\nu_n = \nu_0 + n \cdot \Delta_{ch}, \; n=0,1,\ldots, \qquad (9)$$

where $\nu_0$ is a pre-defined smallest channel frequency. In a typical application, the OPM 1 can be configured for simultaneously monitoring of 40 WDM channels on the 100 GHz ITU grid, or 80 WDM channels on the 50 GHz ITU grid, which are typical numbers of channels in C-band optical communication systems.

For accurate monitoring, it is advantageous to sample the WDM signal S at sampling frequencies that form a periodic grid with a period equal to an integer fraction of the channel spacing $\Delta_{ch}/M'$, where M' is a number of sampling points per channel frequency spacing, so that every WDM channel grid period $(\nu_n-\Delta_{ch}/2, \nu_n-\Delta_{ch}/2)$ includes M' frequency sampling points at same pre-determined positions relative to the respective channel frequency $\nu_n$. A periodic frequency grid defined by the plurality of all these nominal, or target frequency sampling positions spaced by the integer fraction of the channel spacing $\Delta_{ch}/M'$ will be referred to hereinafter as the target frequency sampling grid and denoted as $\Sigma_{M'}$.

The target sampling grid could be approximated e.g. by using an embodiment of the OPM 1 with the number M of the input ports 100 equal to M', the number J of the output ports 110 at least equal to the total number of monitored WDM channels, and the output ports 110 configured so that the first frequency spacing $\Delta f_1 = \Delta_{ch}$. However, the sampling grid provided by the plurality of central frequencies $\{f_{m,j}\}$ of such a device will inevitably deviate from the target sampling grid $\Sigma_{M'} = \Sigma_{M'}$, and may lead to a loss of the spectrum and OSNR monitoring accuracy. In the embodiments of the present invention described hereinbelow, these deviations of the central sampling frequencies $f_{m,j}$ from the target sampling grid $\Sigma_N$, and the undesirable effects of such deviations on the OSNR monitoring, are suitably reduced.

Figure 4:
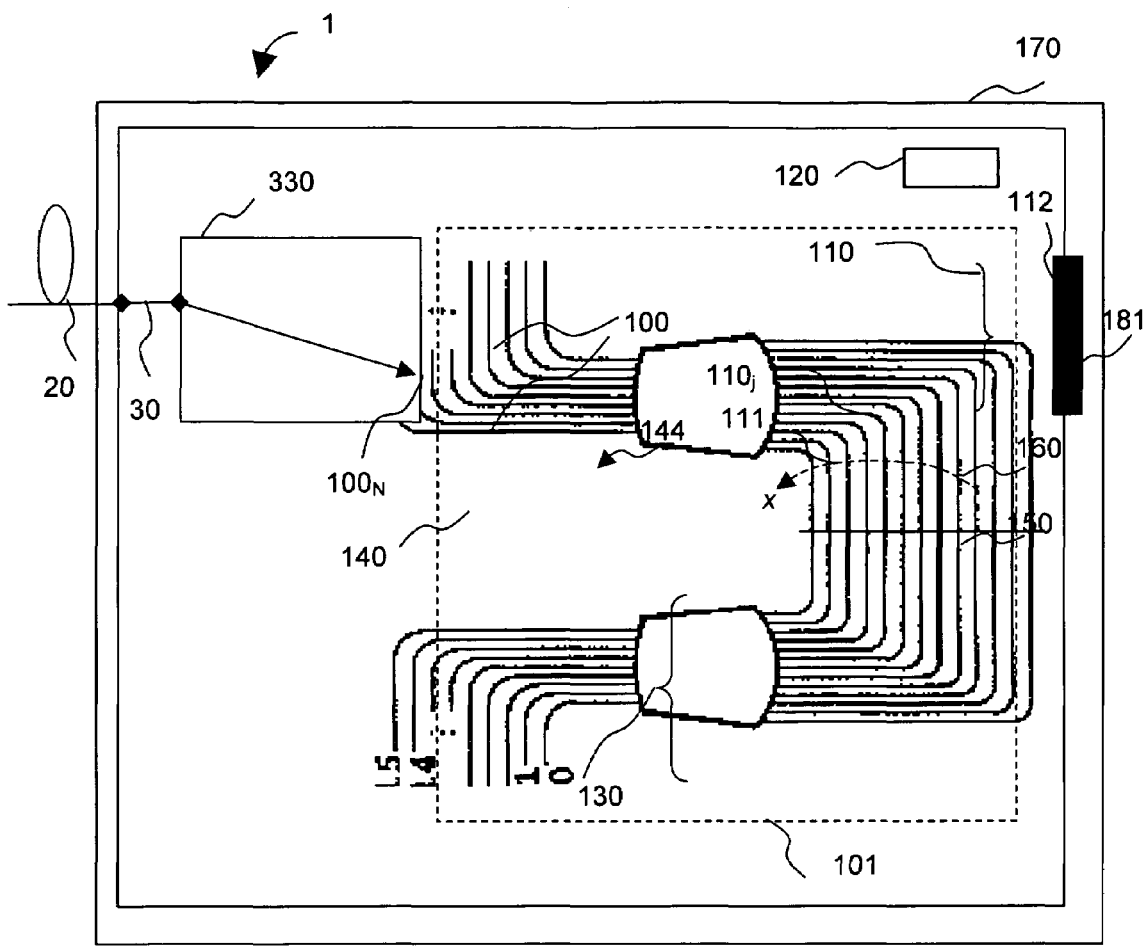
FIG. 4 is a diagram of the AWG-based OPM for monitoring the OSNR of a WDM signal.

First, physical reasons that may result in a non-uniformity of the sampling frequency grid formed by the plurality of all central frequencies $\{f_{m,j}\}$ of the dispersive element 101 will be described with reference to FIG. 4, which shows an embodiment of the OPM 1 of the present invention configured for monitoring the OSNR of the multi-channel WDM signal S in a wide frequency range.

In this figure, the dispersive element 101 is explicitly shown in one embodiment thereof as an AWG 101, which includes an array of length incremented waveguides 130 optically connecting an input concave-slab waveguide 140 and an output concave-slab waveguide 150. The input concave-slab waveguide 140 optically couples each of the M input waveguide ports 101 to each of the length incremented waveguides 130, while the output multimode concave-slab waveguide 150 optically couples each of the length incremented waveguides 130 to each of the J output waveguide ports 110.

The J output waveguide ports 110 are optically connected at their first ends 111 to the output concave-slab waveguide 150 along a focal curve 160, which bounds the slab waveguide 150 opposite to output ends of the waveguide array 130. The M output waveguide ports 110 at their second ends 112 are coupled to the photodetector array 181 having J photodetectors 180.

Figure 5:
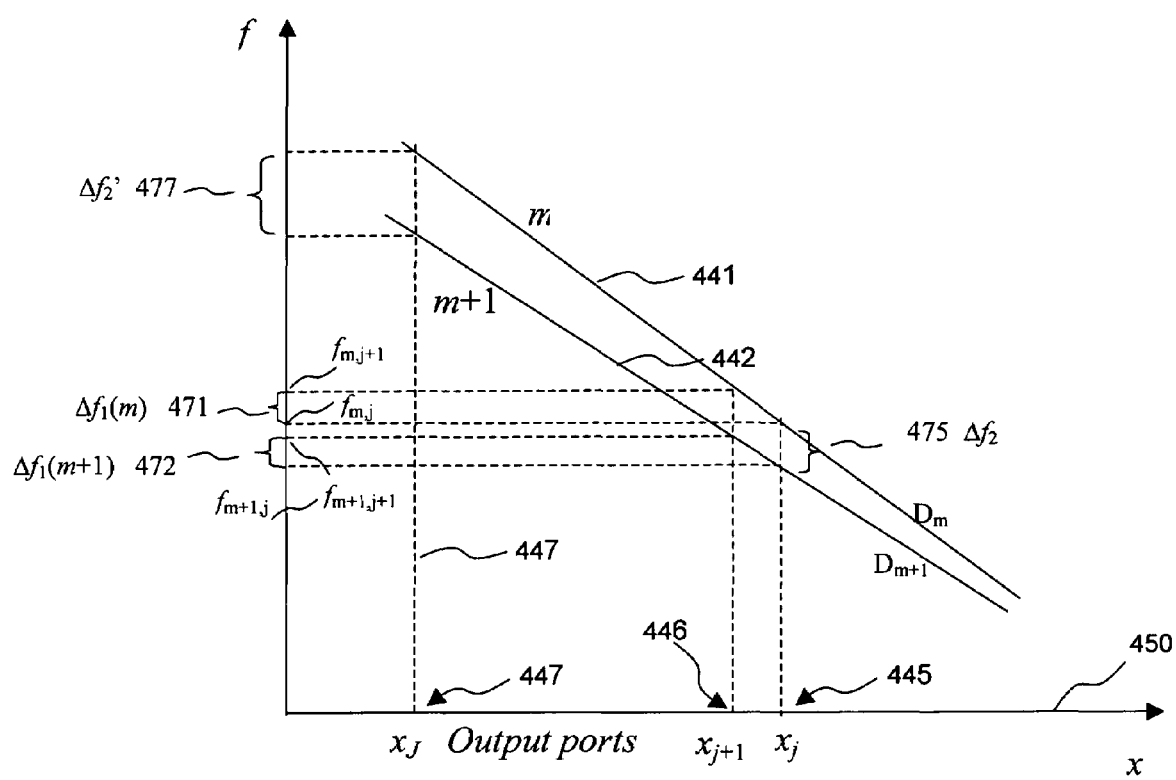
FIG. 5 is a diagram illustrating dispersion characteristics of the AWG shown in FIG. 4.

The multi-channel input optical signal S having an optical spectrum S(f) is delivered via an optical fiber 20 coupled to the input waveguide port 30 of the OPM 1 into the optical 1×M switch 330, operable to sequentially couple the input optical signal into each of the M input ports 100 of the AWG 101. Once the input light is coupled into one, e.g. $m^{th}$ of the input ports 100, the waveguide array 130 disperses the light from the $m^{th}$ input port 100 towards the J output waveguide ports 110 according to the optical spectrum S(f), so that each location x along the focal curve 160 receives a spectral portion of the input light that is centered at a different central frequency $f=f_m(x)$. The function $f_m(x)$, x being a spatial coordinate along the focal curve 160, describes the spatial dispersion of the optical frequency f at the receiving first ends 111 of the output waveguides 110 for light coupled into an $m^{th}$ of the input ports 100. By way of illustration, curves 441 and 442 in FIG. 5 schematically show the dispersion functions $f_m(x)$ and $f_{m+1}(x)$ of the AWG 101 for two adjacent input ports m and m+1 of the M input ports 100, $1 \geq m \geq M-1$. The separation of the curves 441 and 442 and their slopes depends on the relative positions of the $m^{th}$ and $(m+1)^{st}$ input waveguides 100 at the input concave-slab waveguide 140, so that the closer the input waveguides 100 are to each other, the mutually closer are the dispersion curves 441 and 442, and thus the smaller is the frequency shift $\Delta f_2$.

Depending on their locations along the focal curve 160, the output waveguides 110 receive separate spectral portions of the input optical signal from the array of length-incremented waveguides 130 for sampling the optical spectrum S(f) with J sampling functions $T(f-f_{m,j})$ centered at the respective central, or sampling frequencies $f_{m,j=1}, \ldots, f_{m,j=J}$, where the integers m and j, as hereinbefore, refer to the input and output waveguides, respectively. The photodetector array 181 provides J power readings to a processing means, said J power readings representing samples $$S_{m,j}(f_{m,j}) \sim \int T(f-f_{m,j}) \cdot S(f) df, j=1, \ldots, J, \qquad (10)$$

of the optical spectrum S(f) of the input optical signal S at the sampling frequencies $\{f\}_m = \{f_{m,j=1}, \ldots, f_{m,j=J}\}$. By sequentially switching the input signal S between the input waveguide ports 100 and registering the power readings $S_{m,j}$, the input signal spectrum S(f) is sampled at the sampling frequency grid $$\{f_{m,j}\} = \bigcup_{m=1}^{M} \{f\}_m$$

which is formed by the M interleaved frequency sets $\{f\}_m$, $m=1, \ldots, M$. The sampling frequency grid $\{f_{m,j}\}$ is evenly spaced with the fractional frequency spacing $\delta f$, if the following conditions are satisfied: a) all of the interleaved frequency sets $\{f\}_m$ associated with different input ports 100 are evenly spaced with the same frequency spacing $\Delta f_1$ independently on the input port, b) the input ports 100 are configured so that a set $\{f'\}_j$ of M "folded" sampling frequencies $f'_{m=1,j}$, $$\{f'\}_j = \{f'_{m=1,j}, f'_{m=2,j}, \ldots f'_{m=M,j}\} \qquad (11)$$

is evenly spaced with the fractional frequency spacing $\delta f = \Delta f_1/M$, wherein the "folded" sampling frequencies $f'_{m,j}$ relate to the respective sampling frequencies $f_{m,j}$ according to the following equations $$f'_{m,j} = f_{m,j} + (f_{1,j} - f_{m,j}) \mathrm{mod}(\Delta f_1), m=1, \ldots, M, \qquad (12)$$

where the function (x)mod(y) is a modulo operator that returns a reminder of the division x by y. According to equations (11) and (12), the M input ports 100 are configured so that the second set $\{f\}_j$ of M of the central frequencies $f_{m,j}$ can be mapped onto, or, in other words, transformed into a periodic sequence of M sampling frequencies $f'_{m,j}$ spaced by $\Delta f_1/M$ by shifting one or more of the second set of M of the central frequencies by the first frequency spacing $\Delta f_1$ or a harmonic thereof.

Conditions (a) and (b) require that the frequency shift $\Delta f_2(m)$ between the sampling frequencies $f_{m,j}$ and $f_{m+1,j}$ remains substantially the same for all output ports 100 within a pre-defined tolerance. However, this may not be realizable in embodiments wherein the dispersive element 101 is characterized by a spatial dispersion characteristic D=df/dx that varies in dependence on the input port, as it is often the case in real life AWGs, bulk and echelle waveguide gratings and other types of dispersive elements.

With reference to FIG. 5, the spatial dispersion characteristic D, i.e. the rate of change of the optical frequency f of the dispersed light along the focal curve 160, defines the slope of the curves 441 and 442. In the shown embodiment, this slope is approximately constant for each of the input ports 100, i.e. is independent on the spatial coordinate x across the waveguide ends 111, so that an even spacing of the first waveguide ends 111 provides approximately evenly spaced sampling frequency sets $\{f\}_m$. However, D depends on a position of the respective input waveguide port 100 at the input slab waveguide interface 144, and therefore varies in dependence on the input port 100. The lines 441 and 442 thus have different slopes $D_m \neq D_{m+1}$, and this difference increases when the $m^{th}$ and $(m+1)^{st}$ input ports are moved farther away. Accordingly, the frequency spacing 471 of the sampling frequencies associated with the $m^{th}$ input port, which satisfies the equation $\Delta f_1(m) = D_m \cdot \Delta x$, differs from the frequency spacing 472 of the set of J sampling frequencies associated with the $m^{th}$ input port, $\Delta f_1(m+1) = D_{m+1} \cdot \Delta x$, where $\Delta x = (x_{j+1} - x_j)$ is an output port location spacing for the receiving ends 111 of the output ports 110.

The difference $\Delta D=(D_m-D_{m+1})$ in the spatial dispersion characteristics associated with adjacent input ports 100 is typically rather small for a well-designed AWG 101. However, its effect accumulates over a large number of output ports, and can result in significant variations in the frequency shift $\Delta f_2(m)=(f_{m,j}-f_{m+1,j})$, as can be seen by comparing the frequency shifts 477, 475 corresponding to the output port positions 445 and 447. These variations result in an accumulated sampling frequency offset $\delta f_{off}=|f_{m,j}-f^*_{m,j}|\sim F_j\cdot\Delta D/D_m$, where $f^*_{mj}$ is a corresponding frequency position from the target periodic sampling frequency grid $\Sigma_M$, exceeds a pre-determined threshold, e.g. a pre-determined fraction of the fractional frequency spacing $\delta f$.

Note that the sampling frequency error $\delta f_{off}$ is proportional to the spatial dispersion characteristic variation $\Delta D$ between input ports, which in turn depends on the relative positions of the input Vernier ports 100, and is generally greater for the input ports positioned further apart and thus associated with a larger frequency shift $\Delta f_2(m)$. It is therefore advantageous to configure the input ports 100 so that the $\Delta f_2(m)$ is suitably small, while satisfying conditions (3), (3a), (11) and (12).

By way of example, the AWG 101 of the OPM 1 has M=8 input ports and J=40 output ports, and is configured for sampling a WDM signal comprising 40 WDM channels positioned on the 100 GHz ITU grid with a sampling frequency step $\delta f=\Delta_{ch}/M=12.5$ GHz. The output ports 110 are configured for providing a set of 40 sampling frequencies evenly spaced with the first frequency spacing $\Delta f_1\cong\Delta_{ch}=100$ GHz for one, e.g. m=4$^{th}$ of the input ports 100. Tables 1 and 2 hereinbelow illustrate two of many possible embodiments of the AWG 101 of the present invention, which differ by their input port 100 configuration. In each case, the M=8 input ports 100 are configured so to provide a different second set $\{f\}_j$ of M sampling frequencies $\{f_{m=1,j}, f_{m=2,j}, \ldots f_{m=M,j}\}$ as shown in the third row of the tables, and corresponding to one of the output ports 110, e.g. the j=20$^{th}$ port. The second sets $\{f\}_j$ of M sampling frequencies given in Tables 1 and 2 satisfy equations (3), (3a), (11) and (12), with the integer $k_m$ as defined in equation (3). Table 3 is given for comparison and corresponds to an input port configuration as described by Berolo et al.

Table 1 corresponds to the embodiment of the AWG 101 described hereinabove with reference to FIGS. 2a and 3, wherein the M Vernier input ports 100 are configured so that the second set of M central frequencies $\{f\}_j=\{f_{m=1,j}, f_{m=2,j}, \ldots f_{m=M,j}\}$ is evenly spaced with the frequency shift $\Delta f_2=\Delta f_1\cdot(1-1/M)=87.5$ GHz, and spans more than 600 GHz. Disadvantageously, we found that such a large frequency spacing associated with the Vernier ports 110 can result in a relatively large irregularity of the sampling grid $\{f_{m,j}\}$, with the sampling frequency offset $\delta f_{off}$ up to about 6 GHz and more at the edges of the operating frequency range $F_J$, spanning in this case 4 THz.

TABLE 1

| | Input Port index m | | | | | | | |
|---|---|---|---|---|---|---|---|---|
| | 1 | 2 | 3 | 4 | 5 | 6 | 7 | 8 |
| $k_m$ | 0 | 7 | 7 | 7 | 7 | 7 | 7 | 7 |
| $f_{mj}-f_{1j}$, GHz | 0 | −87.5 | −175 | −262.5 | −350 | −437.5 | −525 | −612.5 |

Table 2 corresponds to an embodiment wherein the M input ports 100 are configured so that the set $\{f\}_j$ of M sampling frequencies $\{f_{m=1,j}, f_{m=2,j}, \ldots f_{m=M,j}\}$ is non-even spaced with the frequency spacing between two adjacent central frequencies varying once by $\Delta_{ch}/M=12.5$ GHz; the frequency set $\{f_{m=1,j}, f_{m=2,j}, \ldots, f_{m=M,j}\}$ provided in this embodiment spans only 187.5 GHz, i.e. less than $2\cdot\Delta f_1=2\cdot\Delta_{ch}$, and has an average frequency spacing of only about 26.8 GHz. Advantageously, this configuration generally provides a more regular sampling frequency grid $\{f_{m,j}\}$, with the sampling frequency offset $\delta f_{off}$ equal or less than about 3.5 GHz at the edges of the 4 THz operating frequency range.

TABLE 2

| | Input Port index m | | | | | | | |
|---|---|---|---|---|---|---|---|---|
| | 1 | 2 | 3 | 4 | 5 | 6 | 7 | 8 |
| $k_m$ | 0 | 2 | 2 | 2 | 3 | 2 | 2 | 2 |
| $f_{mj}-f_{1j}$, GHz | 0 | −25 | −50 | −75 | −112.5 | −137.5 | −162.5 | −187.5 |

Although the configuration of the input ports 100 as shown in Table 3 provides the frequency set $\{f\}_j$ that spans only 87.5 GHz, wherein each consecutive sampling frequency is spaced from a previous one by the smallest frequency spacing of only about 12.5 GHz, it was found to lead to an undesirable optical coupling between the input waveguides 100, as described hereinabove, which may result in unsatisfactory performance of the OPM using this configuration. It is therefore preferred that in the OPM 1 of the present invention, the M input ports 100 of the AWG 101 are configured so that two adjacent input ports 100 are associated with sampling frequencies $f_{m,j}$ that are not frequency-adjacent in the sampling frequency grid formed by the plurality of the central frequencies $\{f_{m,j}\}$. It is further preferred that the second set $\{f\}_j$ of M sampling frequencies spans the frequency range $F_M$ that is less than $3\cdot\Delta_{ch}$, more preferably less than $2\Delta_{ch}$. It is further preferred that the frequency range $F_M$ is less than 300 GHz, more preferably less than 100 GHz.

TABLE 3

| | Input Port index m | | | | | | | |
|---|---|---|---|---|---|---|---|---|
| | 1 | 2 | 3 | 4 | 5 | 6 | 7 | 8 |
| $k_m$ | 0 | 1 | 1 | 1 | 1 | 1 | 1 | 1 |
| $f_{mj}-f_{1j}$, GHz | 0 | −12.5 | −25 | −37.5 | −50 | −62.5 | −75 | −87.5 |

Figure 6A:
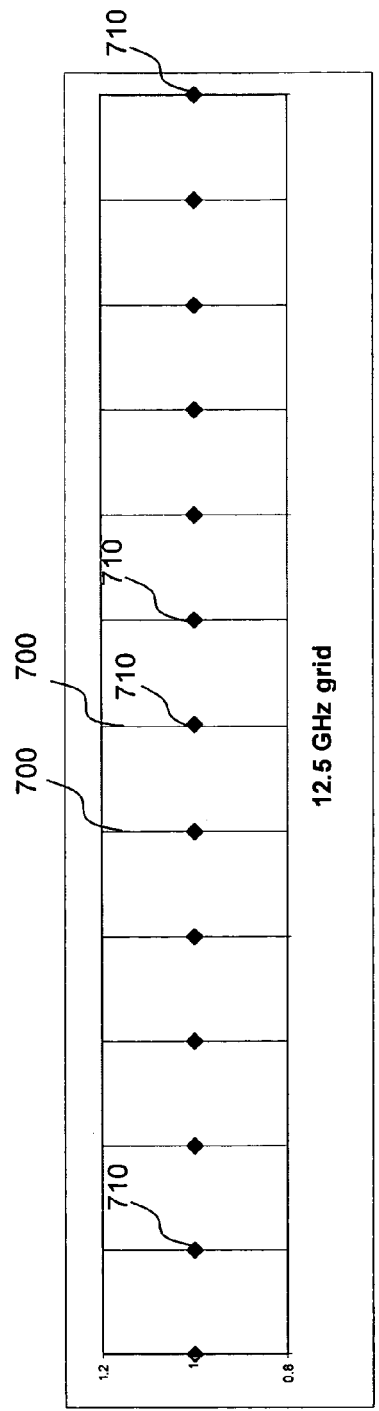
FIGS. 6a and 6b are diagrams illustrating central and edge portions of the sampling grid provided by the OPM shown in FIG. 4.
Figure 6B:
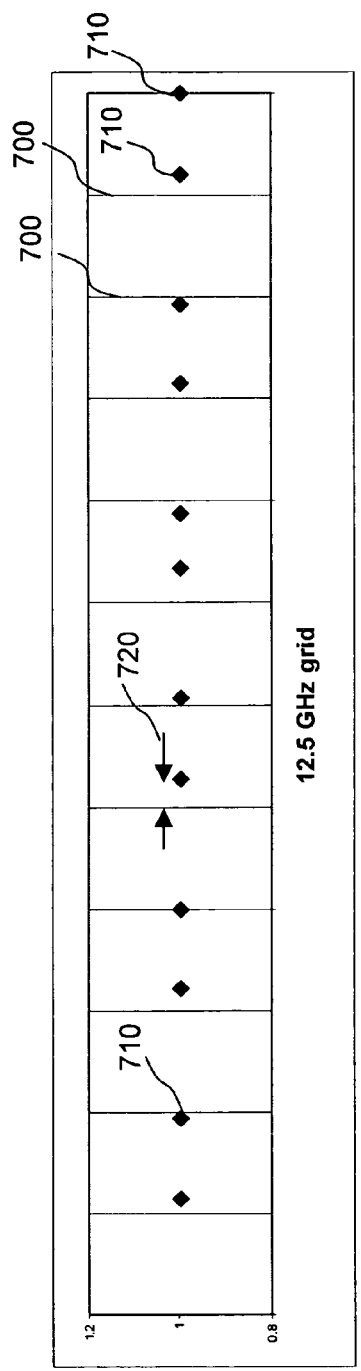

By way of example, FIGS. 6a and 6b illustrate the sampling frequency grid $\{f_{m,j}\}$ for an embodiment of the AWG 101 having the input port 100 configuration corresponding to Table 2. The black diamonds 710 represent the sampling frequencies $f_{m,j}$, and the vertical bars 700 represent the target sampling grid $\Sigma_M$ with a 12.5 GHz period. FIG. 6a shows a central, 150 GHz wide, portion of the sampling frequency grid $\{f_{m,j}\}$ approximately corresponding to 15<j<25, wherein the sampling spacing is still close to the design value of 12.5 GHz, and the sampling frequencies are substantially evenly spaced.

However, the sampling grid $\{f_{m,j}\}$ becomes rather irregular further towards the edges of the operating frequency range of the OPM, as illustrated in FIG. 6b showing an edge portion of the sampling frequency grid $\{f_{m,j}\}$ with j<6, wherein sampling frequencies $f_{m,j}$ deviate from the target locations on the 12.5 GHz grid by the frequency offset $\delta f_{off}$ 720 as large as about 3.5 GHz, which can have a detrimental effect on the accuracy and dynamic range of the OSNR measurements.

Optical Signal to Noise Ratio (OSNR) Measurements

The OSNR of an optical channel is defined as a ratio, usually measured in dB, of a total optical power $P_n$ of a signal component of the optical channel signal to a spectral power $P_N$ of the optical noise within the channel bandwidth:

$$OSNR_{dB} 10 \cdot \log(P_{ch}/P_N). \qquad (9)$$

Figure 7:
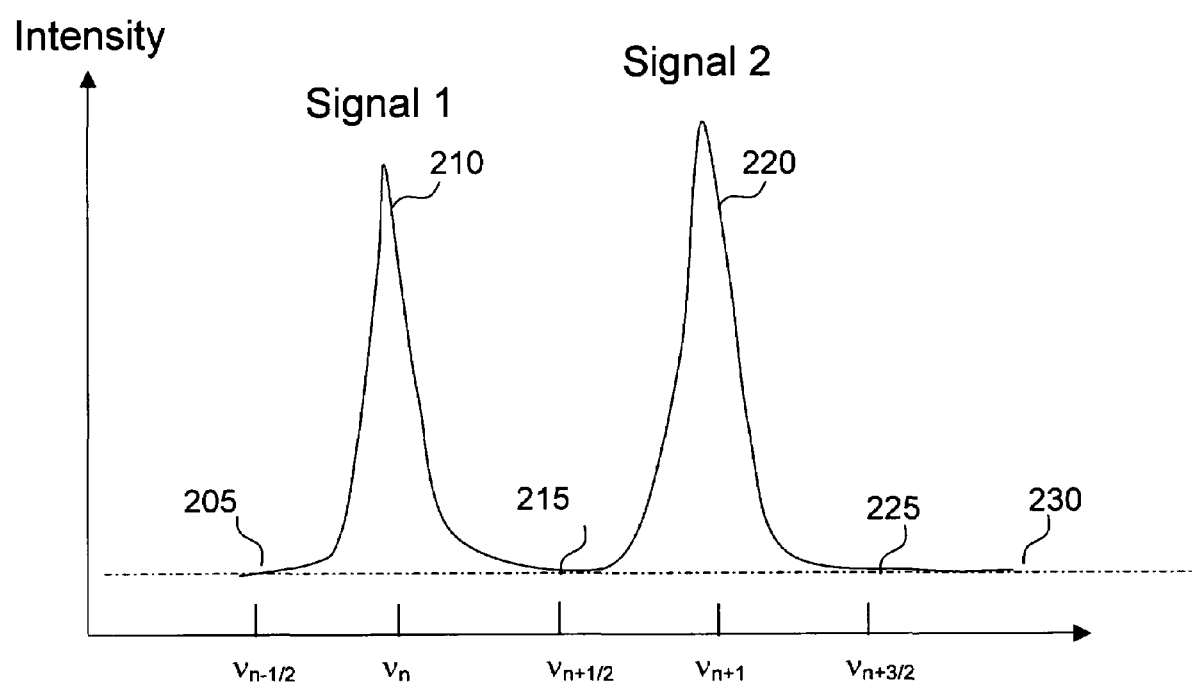
FIG. 7 is a diagram illustrating OSNR measurement of a WDM signal.

The optical noise power $P_N$ is typically determined by measuring the optical spectral power at spectral positions sufficiently away from the spectral peaks associated with the signal components of the WDM channels. This is illustrated in FIG. 7, which shows a portion of the optical spectrum of a WDM signal including two adjacent WDM channels generally centered at frequencies $v_n$ and $v_{n+1}$. The signal component of the channels dominates the spectrum within peaks 210 and 220. Also shown is the noise floor 230.

Using an embodiment of the OPM 1 with a frequency resolution $\delta f = \Delta_{ch}/M$, where $M \geq 3$, the optical signal powers $P_{ch1,2}$ for each of the two channels can be estimated by sampling the peaks 210 and 220 and estimating the area under each of the sampled peaks 210, 220 using e.g. one of known signal processing algorithms of peak finding. The optical noise per channel can be estimated by sampling the optical spectrum at both sides of each signal peak and taking an average. For example, the noise power $P_{N1}$ for the first channel 210 can be measured by sampling the optical spectrum at locations 205 and 215 and taking the average of the two power readings, accounting for a width of the sampling function $T_{m,j}(f-f_{m,j})$. Similarly, the noise power $P_{N2}$ for the channel 220 can be estimated by averaging power readings obtained by sampling the spectrum at spectral locations 215 and 225.

U.S. Pat. No. 6,753,958 to Berolo et al teaches measuring the OSNR of a WDM signal using the echelle grating based spectrum analyzer having multiple switchable input ports by sampling the WDM signal spectrum at a set of sampling frequencies coinciding with the channel center frequencies $v_n$ when the input signal is coupled into a first of the input ports for determining the channel signal power $P_{ch}$, and by sampling the optical spectrum of the WDM signal at another set of sampling frequencies located in the middle between adjacent channels when the input signal is switched into a second of the input ports for determining the optical noise power $P_N$. This approach relies on the sets of sampling frequencies associated with the two input ports being both evenly spaced in frequency with a same constant frequency spacing equal to the channel spacing $\Delta_{ch}$ across the whole operating frequency range of the device. However, this may not be possible for the reasons described hereinabove with reference to FIG. 5, if the operating frequency range of the device $F_J$ wherein the WDM channels are to be monitored is large, e.g. spans the whole S, C or L band. Furthermore, an AWG designed to sample an input WDM signal at channel center frequencies when the input signal is received in one input port, and to sample the input WDM signal in the middle between the WDM channels when the signal is coupled into another input port may suffer from undesirable variations in OSNR measurement accuracy and/or dynamic range across the operating frequency range of the device.

Figure 8A:
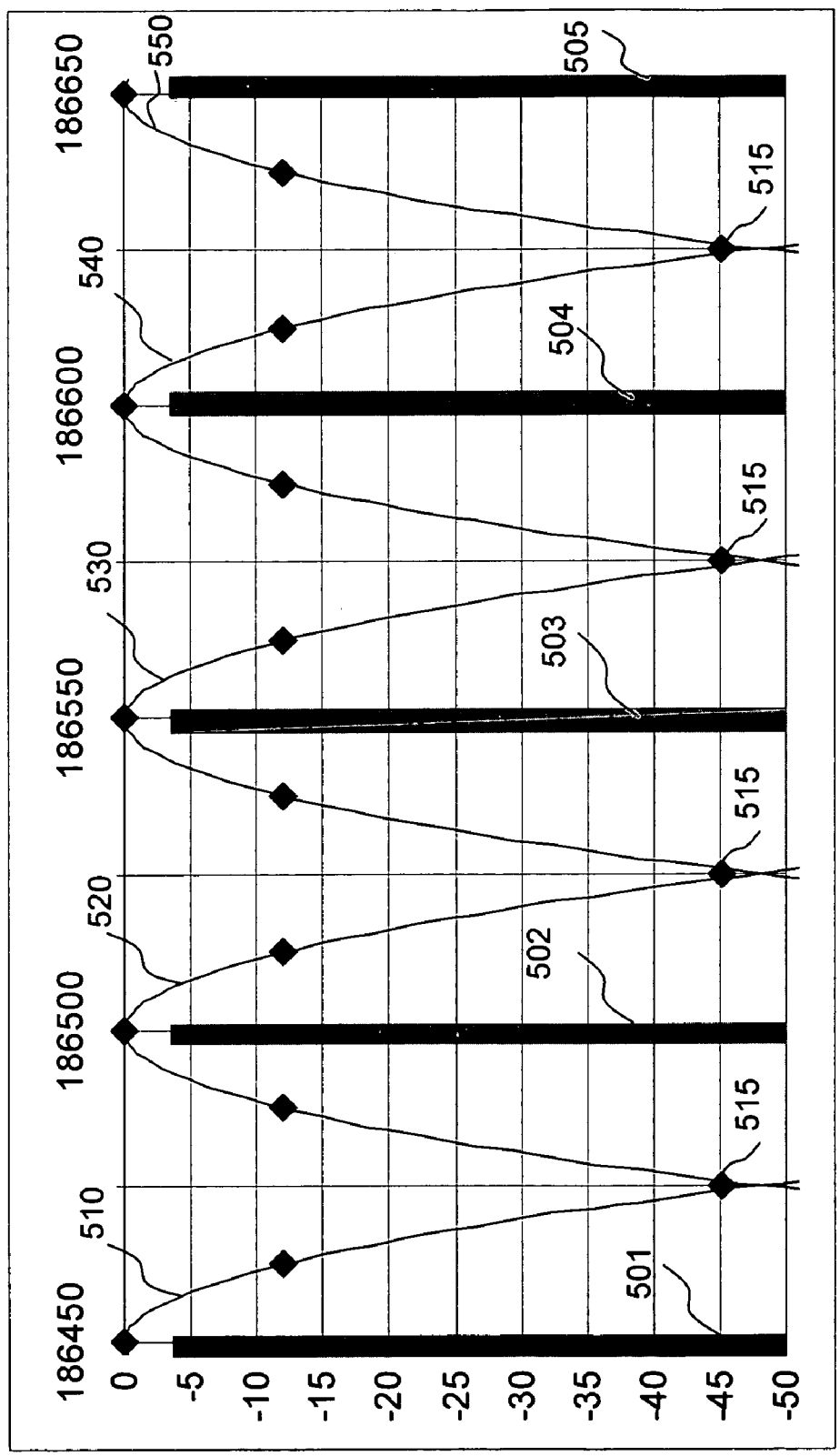
FIGS. 8a, 8b and 8c are diagrams of portions of a WDM spectrum illustrating the sensitivity of optical noise measurements to frequency sampling.
Figure 8B:
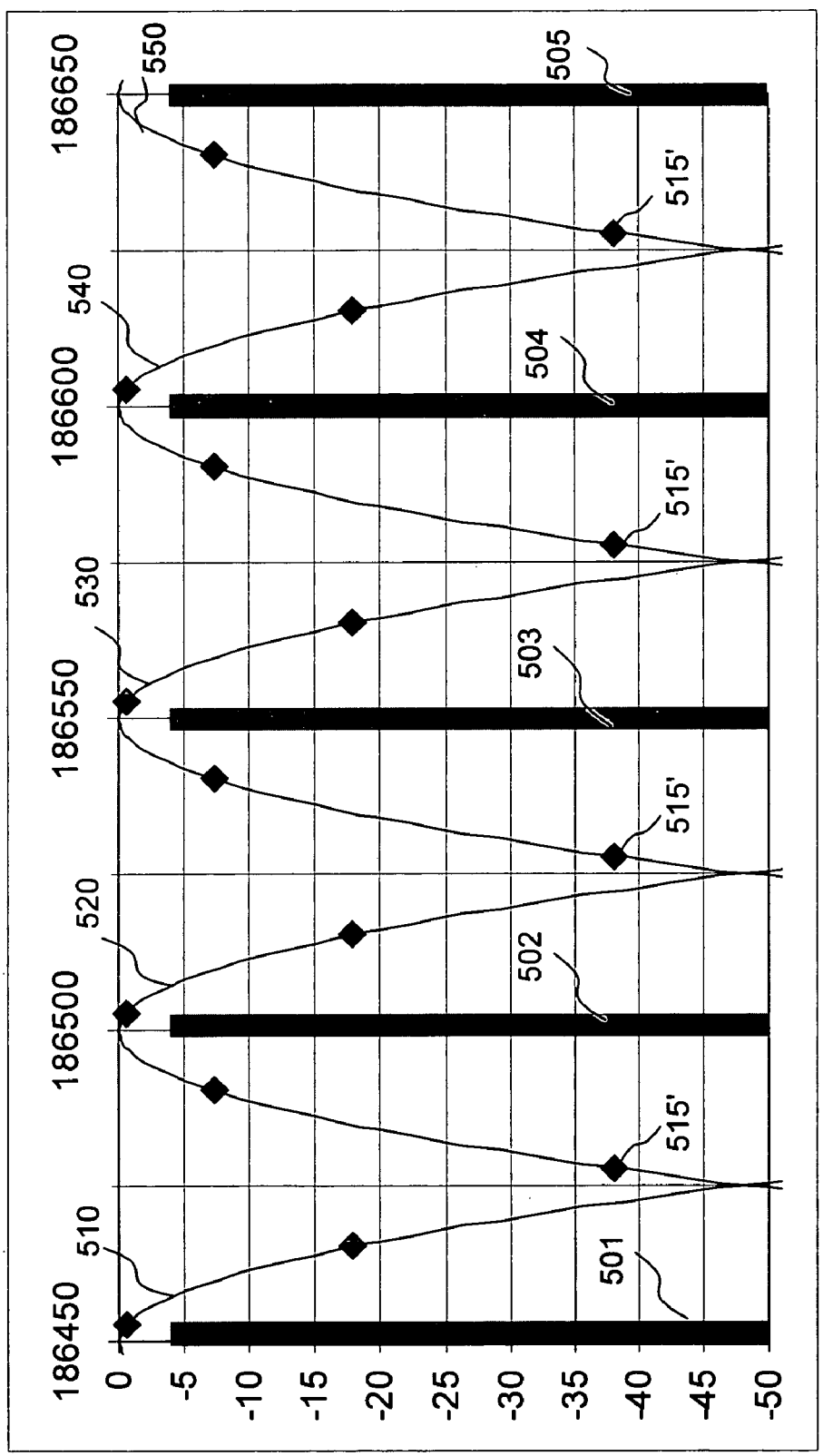
Figure 8C:
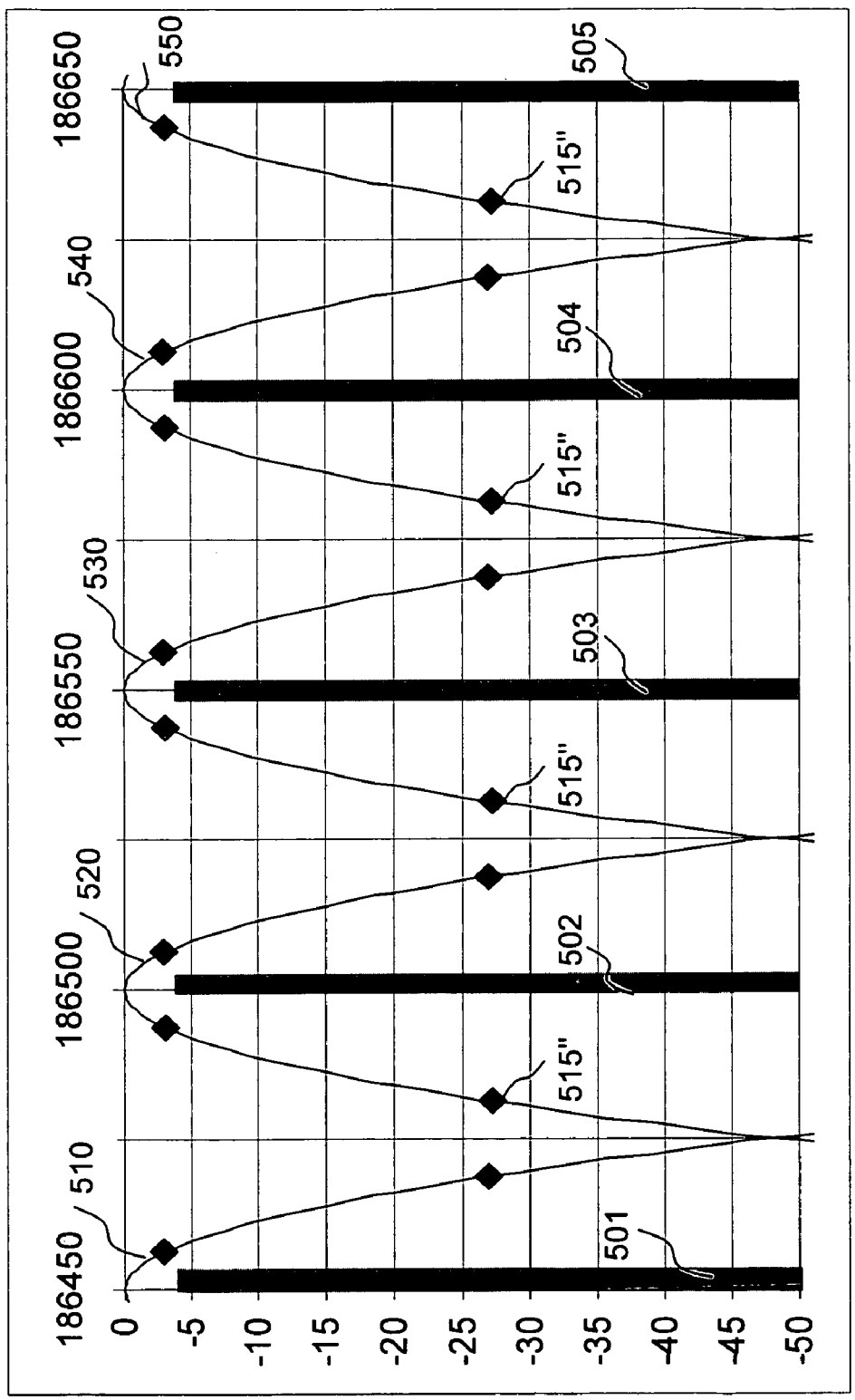

Indeed, the accuracy of OSNR estimation can be very sensitive to the frequency sampling, and in particular—to noise sampling locations, e.g. to exact positions of the sampling locations 205, 215 and 225 in FIG. 7 relative to the signal peaks 210, 220. Typically, a more accurate noise estimation is obtained by sampling the signal spectrum at substantially half-grid positions of the channel frequency grid $v_n = (v_0 + n \cdot \Delta_{ch})$, n=0,1, ..., i.e. at frequencies $v_{n \pm 1/2} = v_n +/- \Delta_{ch}/2$, so that to minimize the optical signal component in the sampled noise reading. This is further illustrated in FIGS. 8a–8c, showing by way of example a portion of the optical spectrum of a WDM signal comprising 5 adjacent WDM channels 510, 520, 530, 540 and 550 spaced by $\Delta_{ch}$=50 GHz in the absence of noise. The WDM signal is sampled at sampling frequencies spaced by $\delta f$=12.5 GHz, as represented in the figures by black diamond symbols, 4 samples per channel. In FIG. 8a, some of the sampling frequencies correspond to exactly mid-points of the WDM channel grid 501–505, as shown by the sampling symbols 515, where the signal component of the WDM channels have the lowest spectral power density, about −48 dB relative to the peak spectral power density for the shown example; this corresponds to an upper limit of ~45 dB for OSNR values that could be measured by noise sampling for the shown WDM signal, with an additional 3 dB of the measured signal power to account for the two nearest contributing channels for each noise sampling point 515.

If the sampling frequencies at which the optical noise is estimated are shifted from the half-grid positions, a much larger portion of the signal component may be included in the noise estimates obtained by the sampling, thereby limiting the dynamic range of the OSNR measurement and its accuracy for large OSNR values. FIG. 8b shows by way of example that if the noise sampling is shifted from the half-grid locations ($v_n + \Delta_{ch}/2$) 515 by about 3 GHz, or 25% of the sampling period $\delta f$, to new locations 515', the dynamic range of the OSNR measurement is reduced by as much as 10 dB. Similarly, FIG. 8c shows that, if the noise sampling locations 515 are shifted by as much as about 6 GHz, or by about $\delta f/2$, to new locations 515", the dynamic range of the OSNR measurement is reduced by as much as 20 dB, and only OSNR values below about 24 dB can be reliably measured. The degradation of the OSNR measurement accuracy an dynamic range is more severe for WDM optical signals in which the channel signal component spreads further in spectrum than as it is shown in FIGS. 8a–8c, and when a finite width of the sampling function $T(f-f_{m,j})$ is accounted for.

Thus, even relatively small deviations of the sampling frequencies 515 from their optimal frequency positions where the signal component has it minimum, e.g. in the exact middle between adjacent channels when the signal spectrum is symmetrical and centered at the channel grid, can severely degrade the dynamic range and the accuracy of the OSNR measurements.

Therefore another aspect of the present invention provides an improved method for monitoring the OSNR of the input optical signal S using the multi-input multi-output dispersive element 101; the method obviates the aforedescribed OSNR measurement issues by focusing on providing accurate noise sampling at pre-determined frequency sampling positions, and using data processing techniques for estimating the signal component of the channels with suitable accuracy. The method is based on the observation that when a typical WDM signal is sampled with a sampling function having a finite width exceeding e.g. 5–10% of the channel spacing, such as the sampling function $T(f-f_{m,j})$ of the AWG 101, which preferably has a bandwidth b slightly smaller than $\Delta_{ch}/M$, a resulting sampled spectrum includes relatively wide peaks dominated by the signal component of the channels, with rather narrow valleys at half-grid positions left for noise estimation, and therefore accurate alignment of the sampling frequencies $f_{m,j}$ with respect to the channel grid $\{v_n\}$ is of considerably higher importance for obtaining accurate noise estimates, than for obtaining accurate estimates of the channel signal power $P_{ch}$.

Turning back to FIG. 4, an embodiment of the OPM 1 of the present invention for accurate OSNR monitoring of the input WDM signal S has a selected one of the M input ports 100, e.g. the N-th input ports $100_N$ shown in FIG. 4, assigned for measuring the optical noise component of the input optical WDM signal S, and the other M−1 of the M input ports 100 assigned for measuring the signal component of the WDM signal.

Accordingly, the J output ports 110 are configured for optical coupling to the selected port $100_N$ at a first set of J of the central frequencies $\{f\}_{m=N}=\{f_{N,j=1}, f_{N,j=2}, \ldots, f_{Nj=J}\}$, which are evenly spaced by the channel frequency spacing $\Delta_{ch}$, i.e. have the first sampling spacing $\Delta f_1 = (f_{N,j} - f_{N,j+1})$ substantially equal to $\Delta_{ch}$, and shifted from the channel frequencies $v_n$ by a pre-determined constant fraction q of the channel frequency spacing $\Delta_{ch}$ for sensing optical noise level between the WDM channels. This can be achieved by suitably positioning the first ends 111 of the output ports 110 along the focal curve 160, so that each of the output ports 110 receives a different spectral portion of the input signal centered at a different sampling frequency from the selected set of sampling frequencies $\{f_{N,j}\}$. The suitable positions of the ends 111 along the curve 160 can be determined using computer simulations, preferably assisted by appropriate experimental verification, as would be known to those skilled in the art.

Figure 9:
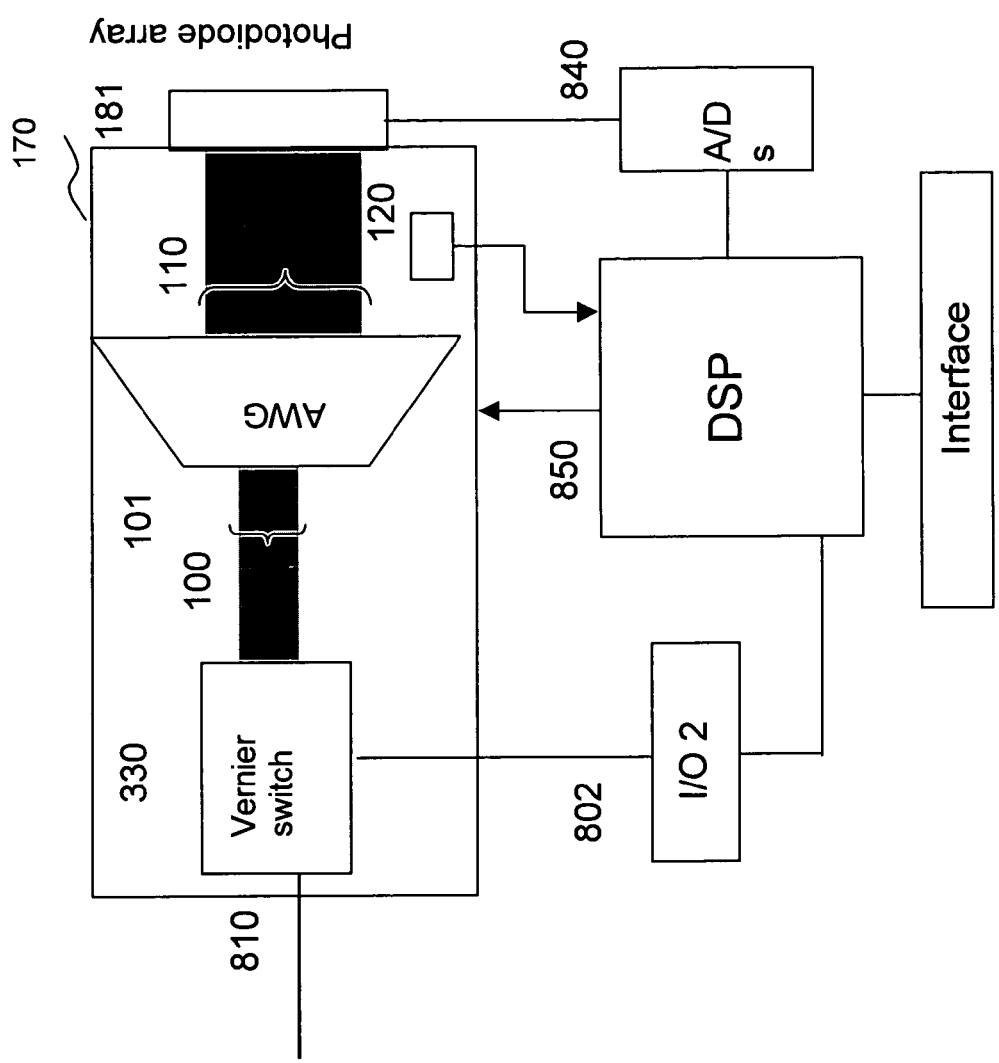
FIG. 9 is a schematic diagram of a control circuitry of the OPM of the present invention.

In operation, when the input WDM signal is coupled into the selected input port $100_N$, the J output ports 110 cooperate with the photodetector array 181 to sample the optical spectrum of the input signal at pre-determined spectral positions between the WDM channels for sensing the optical noise level at said spectral positions, so to provide to the processor 850 shown in FIG. 9 J power readings $\{S\}_N = \{S_{N,j}, j=1, \ldots J\}$, thereby enabling determining optical noise values $P_N$ for the respective WDM channels as described hereinabove.

The pre-determined constant fraction q of the channel frequency spacing $\Delta_{ch}$ is selected for minimizing the signal component at the sampling frequencies $f_{N,j}$. For a typical WDM signal, these optimal spectral positions are the half-grid positions of the channel frequency grid $v_n = (v_0 + n \cdot \Delta_{ch})$, $n = 0, 1, \ldots$, i.e. the frequencies $v_{n\pm 1/2} = v_n +/- \Delta_{ch}/2$. Accordingly, in one embodiment of the OPM 1 the pre-determined fraction of the channel spacing $\Delta_{ch}$ is between $\Delta_{ch}/2 - a$ and $\Delta_{ch}/2 + a$, wherein a is a pre-determined frequency tolerance parameter, so that each of the J sampling frequencies $f_{N,j}$, $j=1, \ldots J$, that is associated with the selected for the noise measurements input port $100_N$, is located in the middle between two adjacent channel frequencies at an equal distance therefrom, deviating from said positions preferably by no more than the pre-defined small frequency tolerance parameter a, typically about or less than 10% of the sampling spacing $\delta f = \Delta_{ch}/M$, or preferably about 2 GHz, and in most preferred embodiment about or less than 1 GHz.

Since the AWG 101 is temperature sensitive, the OPM 1 further comprises a temperature sensor 120 preferably mounted on the PLC wherein the AWG 101 and the switch 330 are implemented close to the AWG 101 for detecting temperature thereof, and a temperature controller 170 for aligning the first set of J of the central frequencies $\{f_{N,j=1}, f_{N,j=2}, \ldots, f_{N,j=J}\}$ at the pre-determined spectral positions between the WDM channels by controlling a temperature of the dispersive element.

The M input ports 100 of the AWG 101 are configured for optical coupling to a selected one of the J output ports at a second set of M of the central frequencies $f_{m,j}$ wherein each adjacent two of the central frequencies are spaced by at least $2 \cdot \Delta_{ch}/M$, or by a frequency spacing satisfying a relation $\Delta_{ch} \cdot k/M$, wherein integer $k \geq 2$ for suppressing unwanted coupling between input ports, The M input ports 100 of the AWG 101 are further configured for optical coupling to the J output ports within $J \times (M-1)$ frequency bands $T(f - f_{m,j})$, each centered at a different sampling frequency $f_{m,j}$, where $m \neq N$ and j spans from 1 to J. The input Vernier ports 100 are preferably configured by suitably positioning their ends at the interface with the concave-slab waveguide 140 so that in operation one of the J output ports 110, e.g. the port $110_{j'}$, is coupled to each of the M input ports 100 at a second set of M central frequencies $\{f_{j',m=1}, f_{j',m=2}, \ldots, f_{j',m=M}\}$ satisfying equations (11) and (12), wherein each adjacent two of the central frequencies are spaced by a frequency spacing $\Delta_{ch} \cdot k/M$, wherein integer $k \geq 2$, or by at least $2\Delta_{ch}/M$ for suppressing unwanted coupling between the input ports 100.

The input port $100_N$ selected for noise measurements is preferably a central of the M input ports 100, i.e. if M=8, the port $100_N$ is preferably a forth or a fifth of the eight input ports 100, but can be any of the input ports 100. In some embodiments, the AWG 101 can have more input ports than M, but using only a subset of M input ports in operation.

Similarly, the output port $100_{j'}$ selected for configuring the M input ports 100 is preferably one of central output ports, e.g. corresponding to j=20 if there are forty output ports 110, but can be any of the output ports 110.

FIG. 9 schematically illustrates a control circuitry that can be used to control operation of the OPM 1 of the present invention. A processor unit 850 in the form of a DSP capable of storing and processing information detected by the J photodetectors of the photodetector array 181 is provided; it can be embodied also as a suitably programmed FPGA, a general purpose microprocessor, or an external computer. An electrical controller 802 controls operation of the Vernier switch 330, together forming control means disposed to receive the input optical signal for providing the input optical signal received via the OPM port 810 sequentially to each of the M input ports of the AWG 101.

The Vernier switch 330 steps through the M input ports of the dispersive element 101 in response to a control signal from the electrical controller 802, thereby providing the input optical signal to predominately one input port of the dispersive element 101 at a time.

At each step, the photodiode array 181 outputs J power readings providing information of the input signal at a set of J frequencies $\{f\}_m$ as described above in this specification, and communicates these power readings through an analog-to-digital converter 840 to the digital signal processing (DSP) unit 850. The DSP unit has an electronic memory wherein a set of J power readings $\{S\}_m$ at a respective set of J central, or sampling, frequencies $\{f\}_m$ is stored in each step. The DSP unit 850 also controls the operation of the electrical controller 802 and the temperature controller 170 while receiving temperature readings from the temperature sensor 170.

The DSP 850 is programmed for determining a noise value of at least one of the WDM channels from the electrical signals representing the power readings $S_{m,j}$ received from the photodetector means 181 when the input optical signal is coupled into the one of the M input ports 100, and determining optical signal power for at least one of the WDM channels from the electrical signals received from the J photodetectors when the input optical signal is sequentially coupled into the other M−1 of the M input ports 100 using a data processing algorithm.

More particularly, the DSP 850 is programmed to processes the stored power readings using pre-stored calibration information to determine the OSNR of at least one of WDM channels present in the input optical signal, by performing the steps of:

a) processing the stored power readings $\{S\}_N$ obtained with the input optical signal coupled to the selected $N^{th}$ input port $100_N$ of the M input ports 100 to determine an optical noise value $P_N$ associated with the at least one of the WDM channels;

b) processing the stored power readings $\{S\}_m = \{S_{m,j}\}$, m=1, ..., M, j=1, ..., J, obtained with the input optical signal coupled to the rest of the M input ports, m≠N, to determine an optical signal value $P_S$ associated with the at least one of the WDM channels; and, c) computing an OSNR value for the at least one of the WDM channels using the respective optical signal and noise values $P_S$ and $P_N$ obtained in steps (a) and (b).

Step (b) may include the step of identifying those of the stored power readings $S_{m,j}$ that are associated with the at least one of the WDM channels using a pre-determined look-up table associating each of the M positions of the switch 330 and each of the J photodetectors from the photodetector array 181 with a respective one of the central frequencies $f_{m,j}$. The look up table may also include information related to the temperature dependence of the central frequencies $f_{m,j}$, with the temperature readings provided by the temperature sensor 120. The optical signal value $P_S$ can be determined from the power readings associated with the at least one of the WDM channels using e.g. a peak recognition algorithm.

Clearly, the aforedescribed steps can be used for computing the OSNR for each of the WDM channels present in the input optical signal.

In one embodiment, the OPM 1 is pre-calibrated, e.g. by using a known input optical signal, stepping the input signal sequentially through each input port of the dispersive element 101, and collecting signals from each photodetector from the photodetector array 181 at each step, and the calibration values are stored in the DSP memory. Information about the shape and width of the transmission bands $T(f-f_{m,j})$ of the dispersive element 101, and measured values of the central frequencies $f_{m,j}$ are also stored in the memory as calibration data used in the processing of values output by photodetectors in operation. The apparatus 1 can also be calibrated over temperature.

Figure 10A:
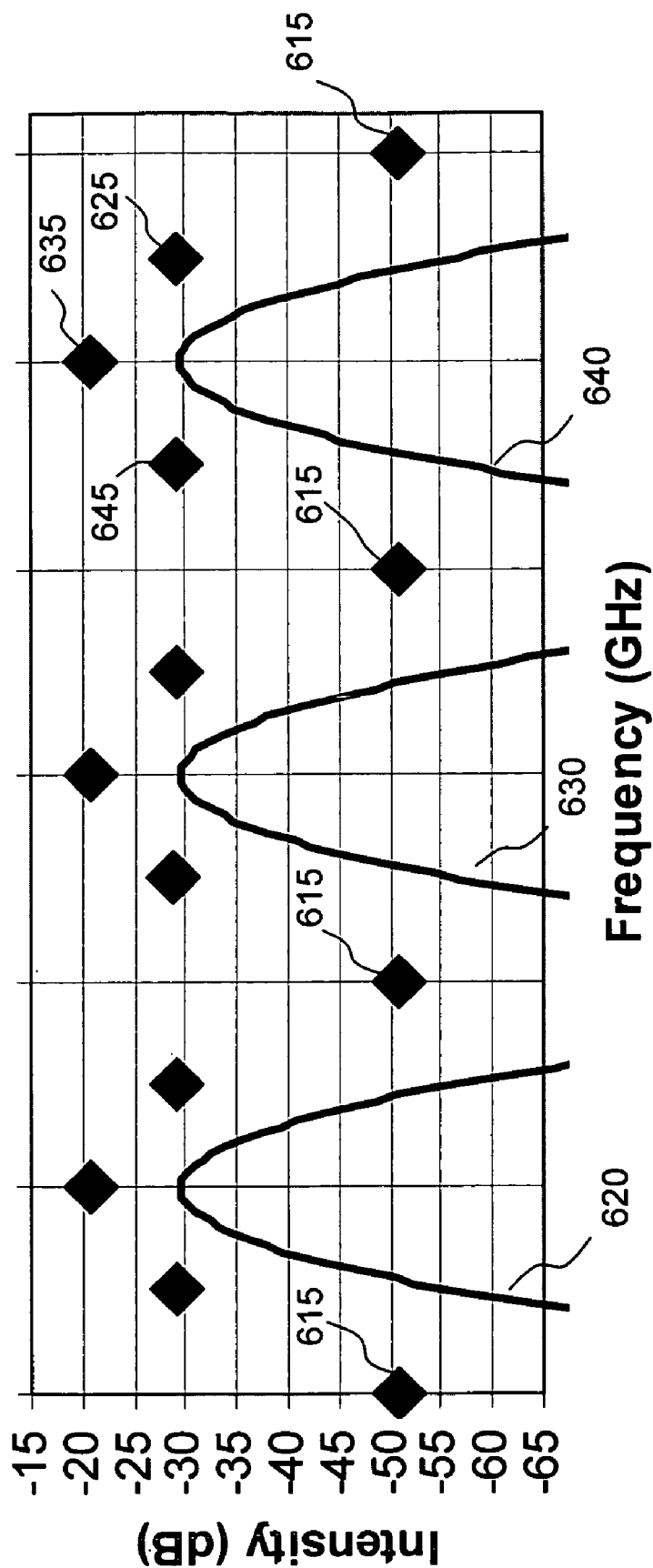
FIGS. 10a and 10b are diagrams of spectral portions of a WDM signal illustrating the sampling frequency grid provided by the OPM of the present invention.
Figure 10B:
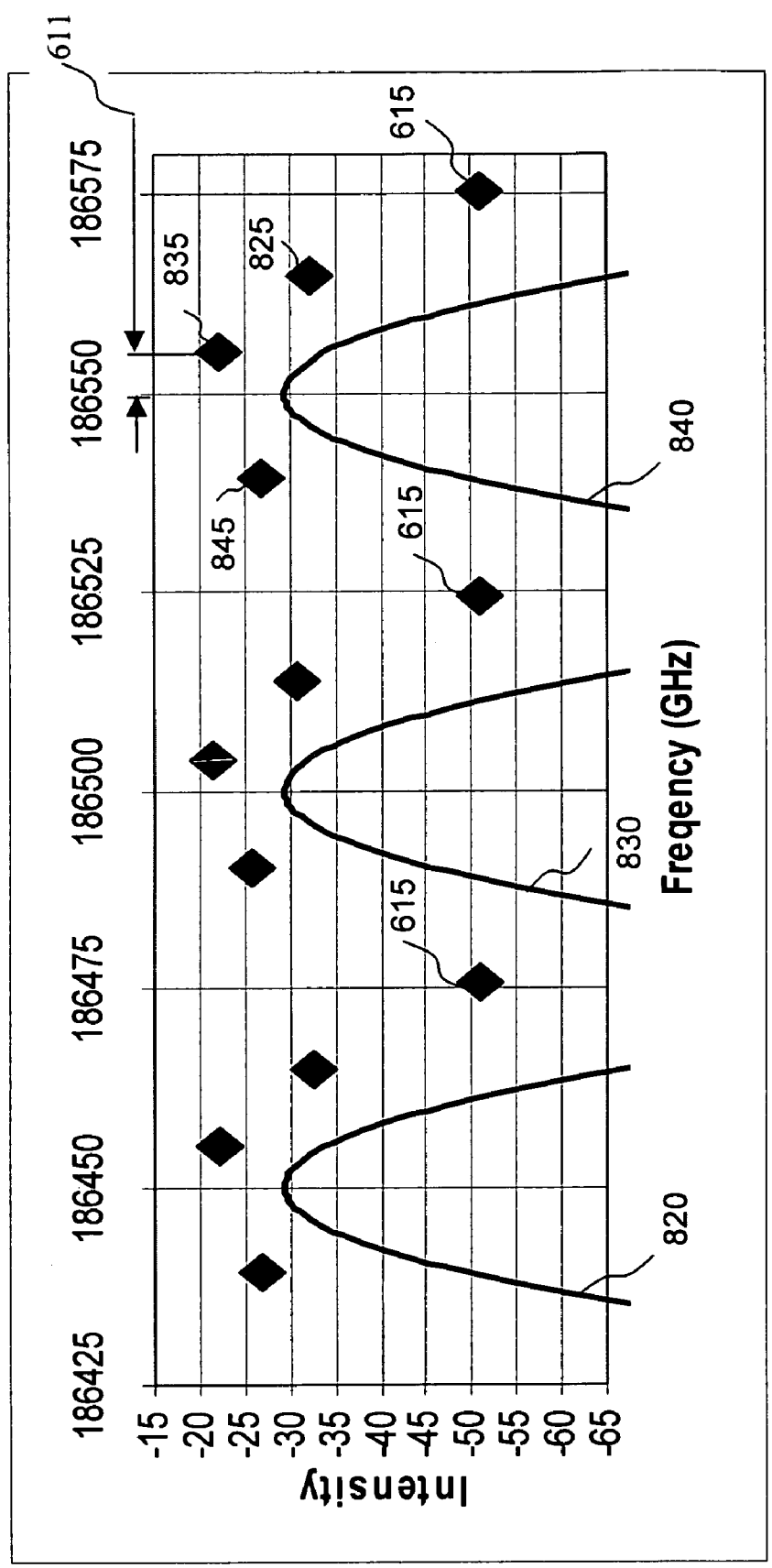

By way of example, FIGS. 10a and 10b illustrate the method of OSNR monitoring according to the present invention using the OPM 1 with the AWG 101 having M=4 input ports and 40 output ports, for a WDM signal on the 50 GHz ITU grid. The black diamonds symbolize spectrum sampling points positioned in frequency according to the sampling frequency grid $\{f_{m,j}\}$ of the AWG 101. The output ports are configured so that when the input light is coupled into the $2^{nd}$ of the four input ports 100, the output ports 110 receive separate spectral portions of the input light centered at the first set $\{f\}_{m=2}$ of 40 sampling frequencies $\{f_{2,1}, \ldots, f_{2,40}\}$ evenly spaced by the channel spacing $\Delta_{ch}$=50 GHz+\−0.5 GHz. The AWG 101 is then temperature tuned so to align the 40 sampling frequencies $\{f_{2,1}, \ldots, f_{2,40}\}$ with the mid-point positions $v_{n+1/2}$ of the 50 GHz ITU grid, as shown by sampling symbols 615. The input ports 100 are configured so that when the input light is switched between them, the central, e.g. $20^{th}$ output port from the array of 40 output ports 110 receives spectral portions of the light centered at the second set of M=4 sampling frequencies $f_{1,20}, \ldots, f_{4,20}$ spaced in frequency by 25, 37.5 and 25 GHz, i.e. $f_{2,20}=f_{1,20}-25$ GHz, and $f_{3,20}=f_{1,20}-62.5$ GHz, $f_{4,20}=f_{3,20}-87.5$ GHz.

This configuration of the input and output ports of the AWG 101 results in the sampling frequency grid $\{f_{m,j}\}$ that is generally periodical in the middle of the sampled spectrum provided by central output ports, e.g. with 15<j<25, as illustrated in FIG. 10a showing 3 adjacent WDM channels 620, 630, and 640 in the middle of the $F_f$=2 THz operating frequency range of this embodiment of the OPM 1, and a sequence of generally periodic sampling frequency points 615, 625, 635, 645 etc.

The sampling grid $\{f_{m,j}\}$ becomes irregular, i.e. aperiodic and un-evenly spaced, towards the ends of the sampled spectrum of the input optical signal as provided by several first or last of the output ports 110, e.g. with $j \leq 5$ and $j \geq 35$, as illustrated in FIG. 10b showing another 3 adjacent WDM channels 820, 830, and 840 at one of the edges of the 2 THz operating frequency range, as provided e.g. by the first 4 output ports 110 corresponding to j=1, ..., 4.

Accordingly, the plurality of central frequencies $\{f_{m,j}\}$ includes the first set of sampling frequencies $\{f_{2,1}, \ldots, f_{2,40}\}$ 615 spread throughout the sampling grid $\{f_{m,j}\}$ that is generally evenly spaced and deviate from their target positions in the exact middle between adjacent channel frequencies by less than the pre-determined frequency tolerance value a, e.g. by less than 2 GHz, and preferably by less than 1 GHz; simultaneously, the plurality of central frequencies $\{f_{m,j}\}$ also includes a sequence of at least M consecutive central frequencies, e.g. the sequence of sampling frequencies shown by black diamonds in FIG. 10b, wherein frequency spacing between adjacent central frequencies varies by more than a pre-determined amount due to the input port dependence of the spatial dispersion characteristic D of the dispersive element 101. For example, the sampling point 835 that may represent the sampling frequency $f_{m=2,j=3}$ deviates from a respective target grid position by a frequency offset 611 of at least 3 GHz, which exceeds the pre-determined frequency offset threshold a, in this example 2 GHz.

The (M−1)=3 sampling points 845, 835 and 825 can be used to estimate the signal power in the channel 840, e.g. by using a peak fitting algorithm assuming a pre-determined shape of the signal peaks 820, 830, 840 etc. This estimation can be done with sufficient accuracy if the frequency offset 611 does not exceed about 30% to 40% of the target sampling frequency spacing $\delta f = \Delta_{ch}/M$, or for the shown example does not exceed about 5 GHz. Advantageously, the noise estimations are performed by using sampling frequencies 615 positioned in frequency at the pre-determined optimal positions between the channels 820, 840, etc equidistantly therefrom with much higher accuracy, e.g. of about 1 GHz or less, thus resulting in suitably accurate noise estimations, enabling thus accurate OSNR monitoring with an enhanced dynamic range compare to the prior art.

While the embodiment wherein the AWG is used as the dispersive element 101 offers some advantages, the dispersive element 101 can be also embodied for example as a bulk blazed grating, a holographic grating, or a volume phase grating. The monitoring means 181 can be embodied with discrete, or arrayed photo-sensitive opto-electronic device, including but not restricted to photo-diodes and opto-thermal-electronic devices, or charged-coupled devices. The switch 330 can also be embodied as a mechanical optical switch, a planar waveguide switch or a MEMs switch.

In summary, the invention provides an optical performance monitor for monitoring an input optical WDM signal capable of accurate OSNR and a related method of OSNR monitoring, which main optical parts can be monolithically integrated in a single LPC chip coupled to an array of photodiodes, and which does not have tunable filters obviating the need for associated control loops. Using an AWG with M Vernier input ports and J outputs in combination with a switch for cycling through the M Vernier input ports, an input signal can be monitored at almost M times more frequencies than using a single-input AWG, on an M times denser frequency grid, while providing enhanced OSNR monitoring capability.

Of course numerous other embodiments may be envisioned without departing from the spirit and scope of the invention.

I claim:

1. An optical performance monitor for monitoring an OSNR of an input optical signal comprising a plurality of WDM channels centered at evenly spaced channel frequencies with a channel frequency spacing $\Delta_{ch}$, the optical performance monitor comprising:
    a dispersive element comprising M input ports and J output ports, wherein M>2 and J>2,
    a control means disposed to receive the input optical signal for optically coupling said input signal sequentially into each of the M input ports;
    a photodetector means optically coupled to the J output ports for providing electrical signals related to an optical power in each of the J output ports when the input signal is coupled into one of the M input ports; and,
    a processing means for determining the OSNR of the input optical signal from the electrical signals provided by the photodetector means;
    wherein the dispersive element is for optically coupling each of the input ports with each of the output ports at a different central frequency in dependence on respective input and output ports for sampling an optical spectrum of the input optical signal at a plurality of the central frequencies when the input light is sequentially coupled into the M input ports,
    wherein the J output ports are configured for optical coupling to one of the M input ports at a first set of J of the central frequencies that are evenly spaced by the frequency spacing $\Delta_{ch}$, and shifted from the channel frequencies by a pre-determined fraction of the channel spacing $\Delta_{ch}$ for sensing optical noise level between the WDM channels;
    wherein the M input ports are configured for optical coupling to one of the J output ports at a second set of M of the central frequencies spaced by at least $2 \cdot \Delta_{ch/M}$.

2. An optical performance monitor according to claim 1, wherein the M input ports are configured so that the second set of M of the central frequencies is transformable into a periodic sequence of M sampling frequencies spaced by $\Delta_{ch}/M$ by shifting one or more of the central frequencies by a channel frequency spacing $\Delta_{ch}$ or a harmonic thereof.

3. An optical performance monitor according to claim 2, wherein the second set of M of the central frequencies spans a frequency range that is less than $2\Delta_{ch}$.

4. An optical performance monitor according to claim 1, wherein the pre-determined fraction of the channel spacing $\Delta_{ch}$ is between $\Delta_{ch}/2-a$ and $\Delta_{ch}/2+a$, wherein a is a pre-determined frequency tolerance parameter.

5. An optical performance monitor according to claim 1, wherein the dispersive element is characterized by a spatial dispersion characteristic that varies in dependence on the input port, and wherein the plurality of central frequencies includes a sequence of at least M consecutive central frequencies wherein frequency spacing between adjacent central frequencies varies by more than the pre-determined frequency tolerance parameter due to the input port dependence of the spatial dispersion characteristic of the dispersive element.

6. An optical performance monitor according to claim 1, wherein the processing means is programmed for
    determining a noise value of at least one of the WDM channels from the electrical signals received from the photodetector means when the input optical signal is coupled into the one of the M input ports, and
    determining optical signal power for at least one of the WDM channels from the electrical signals received from the J photodetectors when the input optical signal is sequentially coupled into the other M−1 of the M input ports using a data processing algorithm.

7. An optical performance monitor according to claim 1, further comprising a temperature controller for aligning the first set of J of the central frequencies at the pre-determined spectral positions between the WDM channels by controlling a temperature of the dispersive element.

8. An optical performance monitor according to claim 1, wherein the dispersive element comprises an AWG.

9. An optical performance monitor according to claim 4, wherein the pre-determined frequency tolerance parameter is 2 GHz or less.

10. An optical performance monitor according to claim 4, wherein the dispersive element comprises a grating having at least M input fiber-optic ports and at least J output fiber-optic ports.

11. An optical performance monitor according to claim 1 wherein the dispersive element comprises a grating having at least M input fiber-optic ports and at least J output fiber-optic ports.

12. An optical performance monitor according to claim 1, wherein the grating is one of a bulk grating, a blazed grating, a volume Bragg grating and a holographic grating.

13. An optical performance monitor according to claim 1, wherein the dispersive element comprises an echelle waveguide grating.

14. An optical performance monitor according to claim 1 integrated on a planar waveguide chip.

15. An optical performance monitor according to claim 1 wherein J is greater than M.

16. A method for monitoring an OSNR of an input optical signal comprising a plurality of WDM channels centered at channel frequencies evenly spaced with a frequency spacing $\Delta_{ch}$, the method comprising the steps of:
    a) providing a dispersive element comprising M input ports and J output ports, wherein M>2 and J>2;
    b) configuring the J output ports for optical coupling to a selected one of the M input ports at a first set of J central frequencies that are evenly spaced by the frequency spacing $\Delta_{ch}$, and shifted from the channel frequencies by a pre-determined fraction of the channel frequency spacing $\Delta_{ch}$;
    c) configuring the M input ports for coupling to the J output ports at J×(M−1) different central frequencies, so that in operation one of the J output ports is optically coupled to each of the M input ports at a second set of central frequencies that are spaced by at least $2\Delta_{ch}/M$;

d) coupling the input optical signal into the selected one of the M input ports of the dispersive element;

e) detecting optical power in each of the J output ports with a photodetector to obtain J power readings, and storing them in a memory unit;

f) sequentially coupling the input optical signal into each of the other M input ports of the dispersive element, each time repeating step (e);

g) processing the power readings obtained with the input optical signal coupled into the selected one of the M input ports to determine an optical noise value for at least one of the WDM channels;

h) processing the stored power readings obtained with the input optical signal coupled into the rest of the M input ports to determine an optical signal value for the at least one of the WDM channels; and, i) computing an OSNR value for the at least one of the WDM channels using the respective optical signal and noise values obtained in steps (g) and (h).

17. A method for monitoring an OSNR according to claim 16, wherein step (c) comprises positioning the M input ports so that the second set of M of the central frequencies can be mapped onto a periodic sequence of M sampling frequencies spaced by $\Delta_{ch}/M$ by shifting one or more central frequencies from the second set of M of the central frequencies by a channel frequency spacing $\Delta_{ch}$ or a harmonic thereof.

18. A method for monitoring an OSNR according to claim 16 wherein the dispersive element comprises an AWG.

19. A method for monitoring an OSNR according to claim 16 further comprising the step of identifying power readings obtained in step (f) that are associated with the at least one of the WDM channels using a pre-determined frequency or wavelength look-up table, wherein step (h) comprises determining the optical signal value from the power readings associated with the at least one of the WDM channels using a peak fitting algorithm.

20. A method for monitoring an OSNR according to claim 16, wherein the pre-determined fraction of the channel frequency spacing is $\Delta_{ch}/2$.

* * * * *